United States Patent [19]
Davis et al.

[11] 3,905,025
[45] Sept. 9, 1975

[54] DATA ACQUISITION AND CONTROL SYSTEM INCLUDING DYNAMIC INTERRUPT CAPABILITY

[75] Inventors: Michael I. Davis; John M. Loffredo; Larry E. Wise; Patrick L. Rickard, all of Boca Raton, Fla.

[73] Assignee: International Business Machines Corporation, Armonk, N.Y.

[22] Filed: Apr. 16, 1974

[21] Appl. No.: 461,337

Related U.S. Application Data

[63] Continuation of Ser. No. 194,075, Oct. 27, 1971.

[52] U.S. Cl. .......... 340/172.5
[51] Int. Cl.[2] .......... G06F 3/00
[58] Field of Search .......... 340/172.5

[56] References Cited

UNITED STATES PATENTS

| | | | |
|---|---|---|---|
| 3,573,852 | 4/1971 | Watson et al. | 340/172.5 |
| 3,611,307 | 10/1971 | Podvin et al. | 340/172.5 |
| 3,713,109 | 1/1973 | Hornung | 340/172.5 |
| 3,781,810 | 12/1973 | Downing | 340/172.5 |
| 3,825,902 | 7/1974 | Brown et al. | 340/172.5 |

*Primary Examiner*—Gareth D. Shaw
*Assistant Examiner*—John P. Vandenburg
*Attorney, Agent, or Firm*—John C. Black; Carl W. Laumann, Jr.; J. Jancin

[57] ABSTRACT

This data acquisition and control system includes many features for enhancing real time response to external or internal conditions. One feature relates to the use of multiple processor control circuits which can be switched between active and inactive status for controlling the performance of processor operations as a function of the level of priority of received interrupt service requests. Another feature pertains to I/O devices attached to the processor. These I/O devices include means for retaining data dynamically allocable by the processor program for specifying assigned interrupt levels and/or for identifying the requisite servicing subroutine in the processor to permit rapid response when an interrupt service is granted. The devices monitor their own status and provide a summary bit to the processor identifying whether or not a status data interchange is required. Multiple masking allows the processor to select between masking all interrupts, interrupts from any source on one or more interrupt priority levels, interrupts from a particular device or devices, or any combination of these.

14 Claims, 9 Drawing Figures

INVENTORS
MICHAEL I. DAVIS
JOHN M. LOFFREDO
PATRICK L. RICKARD
LARRY E. WISE

BY Carl C. Hancock
ATTORNEY

DATA ACQUISITION AND CONTROL SYSTEM INCLUDING DYNAMIC INTERRUPT CAPABILITY

This is a continuation of application Ser. No. 194,075 filed Oct. 27, 1971.

CROSS REFERENCE TO RELATED APPLICATION

Application Ser. No. 194,078 filed concurrently herewith, entitled, "Interface Multiplexer", by R. L. Patrick and P. L. Rickard, now U.S. Pat. No. 3,706,974 and assigned to the same assignee as this application describes circuitry useful for permitting rapid processor/device interfacing in a system environment such as is described in this application.

BACKGROUND OF THE INVENTION

1. Field of the Invention

This invention is concerned with data processing equipment intended for operation in a real time environment. More particularly, this invention relates to processors, I/O devices and/or the interface operation therebetween in a configuration particularly useful for the relatively fast responses required in data acquisition and process control type environments. The various features of this invention are especially useful for handling a high frequency of interruption driven routines ot an essentially simple nature. This invention and its various features makes it possible to apply digital data processing equipments with their attendant advantages in a manner which permits substantially real time response to a veritable plethora of various external conditions requiring servicing despite the relatively complex interrelation between the processor operation and those external conditions.

2. Description of the Prior Art

The digital data processing technology has developed such that relatively economic and fast data processing steps can be performed with a high degree of flexibility. In most computer systems, the input/output or I/O devices associated with the processor can be used for data exchanges in a manner which permits buffering, queuing and various other techniques since fast responses are usually not demanded by such devices. However, the data acquisition and process control environment typically demands more rapid response and provision of control functions from the central processing unit than is encountered in many computer applications. For instance, computer process control generally involves the acquisition of analog and digital data from an industrial process or the like, the calculation of control corrections to insure the proper functioning of the process and the application of appropriate control signals to the controlling elements in the process in a fast and timely manner. To be effective, the acquisition, calculation and control function generation must be performed in real time; that is, the delay between acquiring the data from a multiplicity of sources and controlling the functions or processes involved must be such that the effectiveness of the control is not lost. For many applications, this means that the delay can be no more than fractions of a second, although other applications involved in the same system may be capable of tolerating hours of delay. The time between a stimulus such as from analog or digital sources and the system response is frequently termed the interrupt response time and is the most important figure of merit in real time computer systems. Experience has shown that those stimuli requiring the shortest interrupt response times in a system are frequently characterized by short, simple coding which does not require and often cannot tolerate the use of conventional I/O resources.

Prior art data acquisition and process control systems have differentiated between the response time required by a complex of I/O devices by assigning interrupt priority levels to those devices. Thus, an interrupt originating from one I/O device of a low priority may be in process by a controlling processor but that interrupt might be itself interrupted by a higher level priority occurring later in time from yet another I/O device. The prior art systems employed fixed priority level arrangements for each I/O device so that it always contended for the processor attention on that level and required rewiring of the device in order to change its priority level. Even when the higher level priority interrupt occurred, the prior art processors required a sequence of special servicing routines for the purpose of placing data corresponding to the status of the interrupted process in storage so that it can be subsequently retrieved and reloaded into the control circuits of the processor after the higher priority interrupt has been satisfied. Such a procedure requires acceptance of the time delays involved in this storing procedure as well as additional delays in recovering the stored data at a later time. Additional processing delays were demanded by the prior art systems in order for the processor to identify the interrupt source and to acquire status identifying signals from it before proceeding with servicing the request. Beyond that, restitution of the interrupted program was subjected to the hazards of program errors and oversights. Further, the processor required means for determining the appropriate servicing subroutine before the interrupt can be handled. An example of a prior art system is the IBM 1800 Data Acquisition and Process Control System.

Many of the requirements for data acquisition and/or process control environments involve data exchanges and control functions which vary in their requirements for timeliness of response from time to time. For instance, some applications can tolerate relatively slow responses for a particular data exchange or control function over relatively long periods of time but for other time increments demand substantially instantaneous responses and controls. However, the prior art systems generally tended to be relatively rigid in their structural organization after the system has been established and have not permitted changing of the priority level which a source can use for competing for servicing. This means that a device requiring critical response for only short periods out of a given day must either be always handled as a critical interrupt or must be inspected at the processor and effectively masked out through software manipulation which thus places an unnecessary burden on the processor and potential degradation of response time to other interrupt requests.

SUMMARY OF THE INVENTION

This invention is concerned with several features and improvements in data processing systems particularly applicable to data acquisition and process control for the purpose of substantially enhancing the ability of such systems to respond to a variety of digital and analog input/output devices in a relatively complex configuration. One feature of the present invention is concerned with providing multiple priority level correlated processor components each of which has the capability of operating with the processor storage and logical units in a configuration independent of the other processor controlling components. These controlling components are switchable as a function of the highest level priority service request present at any given time but the inactive such components are arranged so that they retain the data correlated to the status of its processing function when interrupted. This particular feature of this invention is sometimes referred to as a virtual machine since it has the characteristics of multiple processors that are priority level selected but which use various time shared components.

Another feature of the present invention is the inclusion of hardware in the external devices which stores program define interrupt priorities so that the processor can dynamically allocate the particular priority level on which such a device will compete for servicing but still retain the ability to change that priority level dynamically. These I/O devices can further include means for storing a program defined sub-address that can be returned to the processor when an interrupt occurs so that the processor is immediately conditioned to retrieve the correct interrupt servicing subroutine from storage when the interrupt request is granted. Yet another feature includable in the I/O device is a special mask type bit which the processor program can control to either permit or block interrupt requests from that device. This device oriented mask in conjunction with masks at the processor to permit controlling any interrupts from given levels or preventing all interrupts provides the processor with an extremely high degree of flexibility in dynamically controlling the interrupts that can appear and the timing thereof. A still further feature associated with the I/O devices is the use of a summary status generator for surveying the condition of the various device status indicating signals to provide a single bit to the processor. The processor can then inspect that single bit when an interrupt is granted and bypass any further status exchange if such action is appropriate or can revert to the status indication exchanging if the bit indicates such action is required.

A processor using the various features of this invention can be used either as a nucleus of a stand-alone data acquisition and control system or it can be used as an intelligent channel/control unit or pre-processor for attachment to other computer systems. No change is required in the processor between these two configurations. This ability to grow from a small stand-alone system to a large, interconnected, multi system is particularly important in the data acquisition and control field with its wide and dynamically variable range of total system performance requirements. The processor is isolated from its I/O devices by a channel which also provides some control unit function.

In addition to the potentially variable sepctrum of time response demands that are encountered, it is also necessary for a data acquisition and process control system to provide a range of computing power. Generally most functions requiring a fast time response are simple in nature and do not require a significant amount of computing power. Other functions necessary within the total system, however, require considerable computing capability. In a direct digital control DDC application, for instance, the computing requirements for controlling the DDC loops are relatively small. Algorithms are repetitive in nature but must be performed on a frequent basis. However, the optimization program that may provide target values to the DDC program is run only occasionally but requires considerable computing power. Thus, within the same computing complex, both simple and extensive computing power demands are potentially present. The present invention with its various features provides the flexibility to meet these requirements in such a manner that the systems operating characteristics can be dynamically changed while addressing a particular problem and additional I/O modules can be added or deleted with relative ease.

A primary object of the present invention is to provide components which enhance the real time response of a data processor.

Another object of the present invention is to provide a virtual machine processor organization particularly useful for data acquisition and process control environments.

Still another object of the present invention is to provide a processor having multiple control components organized so that different tasks can be processed on the basis of priority interrupt levels with minimum time lost in switching between those levels.

A further object of the present invention is to provide I/O modules having dynamically assignable interrupt priority levels.

A still further object of the present invention is to provide I/O modules which are capable of dynamically storing address information correlated to servicing subroutines stored in a controlling processor.

Yet a further object of the present invention is to provide I/O modules which have the capability of being individually masked under control of a main processing system.

An additional object of the present invention is to provide an I/O module which surveys its own status and which can provide a signal to a controlling processor indicating whether or not status exchanges are required.

Another object of this invention is to provide real time responses to dynamically changeable external requirements while permitting substantial additional program processing at the controlling processor unit.

Yet another object of the present invention is to provide a polymorphous data processing system which can adapt to varying input/output requirements on a dynamic basis.

The foregoing and other objects, features and advantages of the present invention will be apparent from the following more particular description of the preferred embodiment of the invention as is illustrated in the accompanying drawings.

DETAILED DESCRIPTION OF PREFERRED EMBODIMENTS

I. Introduction

Figure 1:
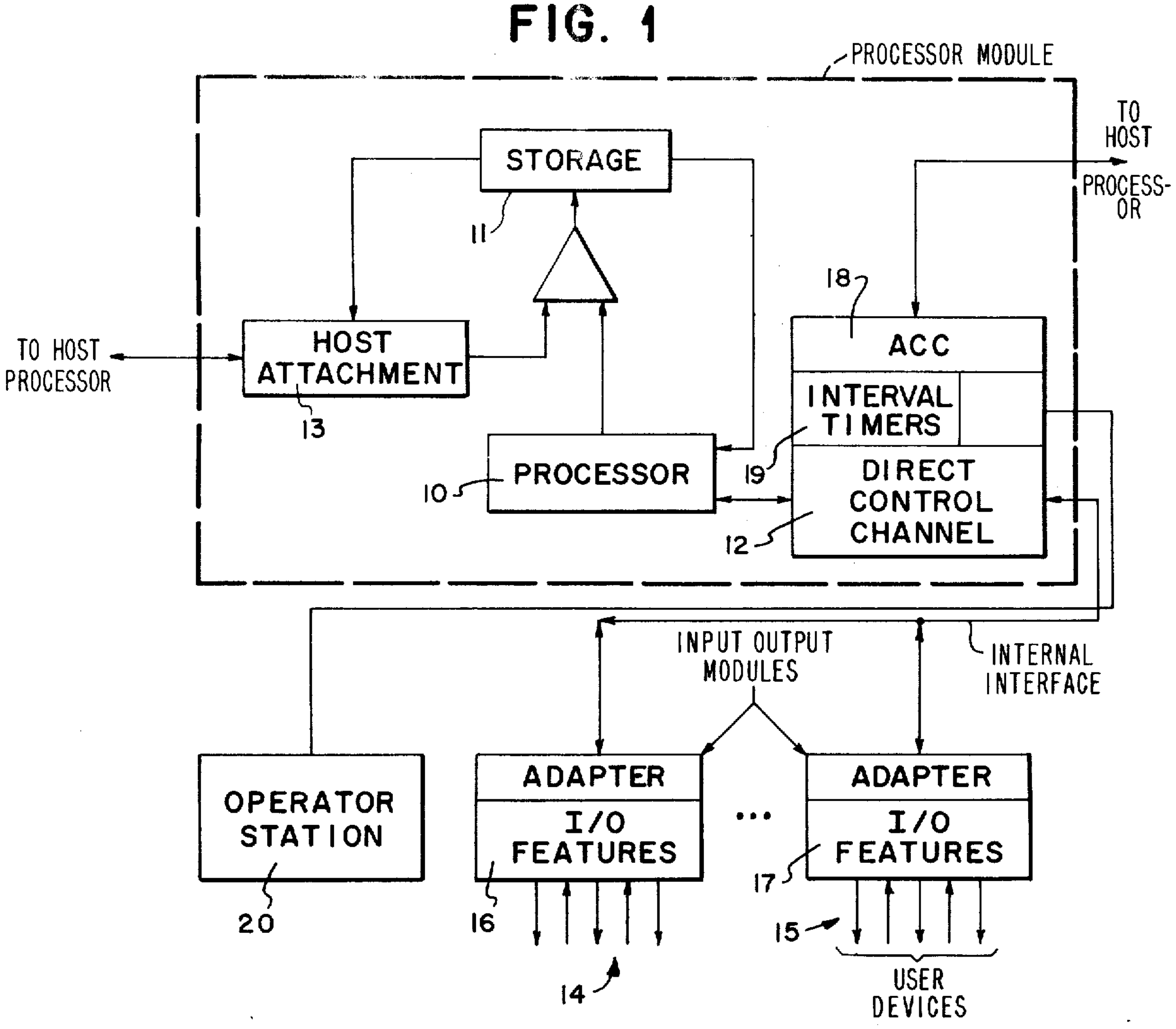
FIG. 1 is a system block diagram showing the general environment of the various system components and other processors with which the present invention is interrelated.

The processor and related equipments in accordance with this invention is designed primarily for data acquisition and control applications and has been substantially implemented in the IBM System 7. Many of its design features are, however, advantageous in any system having real time processing requirements.

Such systems are required to react to external stimuli, execute the required service routines and respond with reaction to the original stimulus. The time between a stimulus and its response is frequently termed the interrupt response time, and is the most important figure of merit in real time computer systems. Experience shows that those stimuli requiring the shortest interrupt response times in a system are usually characterized by short, simple routines which do not require the use of conventional I/O or other system resources.

To minimize response times, the present invention includes hardware which commits software to allocate interrupt priorities which can be disabled or dynamically reallocated as the software desires. Also the processor hardware is implemented with sets of registers and conditions for each interrupt level so that the concept of virtual machines is implemented in hardware and allows for a very fast starter switch upon interruption. Switching between registers as part of the mechanism for handling interrupt obviates the need for the software save and return operations which contribute to the overhead of interrupt handling. The processor of this invention can be used either as the nucleus of the stand-alone data acquisition and control system or it can be used as an intelligent control unit or preprocessor for attachment to other computer systems. This ability to grow from a small stand-alone system to a large interconnected multi system is particularly important in the data acquisition and control field with its wide and variable range of total systems performance requirements.

The processor is isolated from its I/O devices by a channel which is described elsewhere. Those elements of the channel functions which relate to interrupt control will be described herein. The channel structure is assumed to be such that up to 63 I/O modules may be attached to the interface which it provides. Each I/O module is further assumed to be able to hold up to 64 devices. The processor channel and storage reside in a module known as the processor module and certain devices are native in the processor module. These include the asynchronous communications control adapter ACCA, the operator station adapter and two interval timers.

Some of the novel features of the present invention include (1) the realization and hardware of the concept of virtual machines for multi-level interrupt handling which has been available in the past only through software with the attendant overhead; (2) the extremely fast status switch time due to automatic sublevel branching and the provision of immediate identification (with status) of the source of interruption; (3) the selection of an instruction set which is optimized towards fast, simple interrupt driven subroutines; (4) a comprehensive, fast, open-ended I/O handling capability; (5) the ability to interconnect to another processor; (6) the interaction of priority interrupts and class interrupts; (7) the provision of extremely descriptive non-ambigious status indicators permitting easy software retry of hardware and software malfunctions.

II. Data Flow

The processor 10 data flow shown generally in FIG. 1 and more particularly in FIGS. 2, 3, 6 and 7 is made up of an Instruction Address Register, four working registers, an Arithmetic and Logic Unit (ALU) and a Local Store array, plus a Mask register IRM.

The Instruction Address Register (IAR) 30 is sixteen bits wide and is loaded from Data Funnel 31. The IAR can be incremented by 1 without using ALU 32 and contains an instruction address as is known in the art. The Operation Register (OP) 33 is also 16 bits wide but is loaded from storage 11. It contains the first word of all instructions. The Storage Data Register (SDR) 34 can hold 16 bits plus byte parity. It is loaded from Storage 11, the Data Funnel 31 or Data Switches. It selectively drives the Direct Control Channel 12, Storage 11, or Y funnel 35. The Storage Address Register (SAR) 36 is 16 bits loaded from Data Funnel 31 or IAR 30 and contains current storage address.

The 16 bit Y Funnel 35 gates operands into the Y register 37 or Data Funnel 31 and also acts as input for data from Direct Control Channel 12. The Y operand Register (Y) 37, a 16 bit shiftable left and right register, is loaded from Y Funnel 35 and acts as a buffer for one operand of ALU 32. The Arithmetic and Logical Unit (ALU) 32 is a sixteen bit, parallel, two operand combinatorial switching circuit. One operand is provided by the ALU Funnel 38 and the other by the Y Register 37 and/or force lines. The ALU 32 is capable of performing addition, subtraction and the logical operations AND, OR or XOR. It is also used for address arithmetic.

Local Store Array

To facilitate a fast status switch, all program addressable registers and conditions registers (21), are held on a per-level basis in the local store array: switching between register banks to access the appropriate level is an automatic hardware function. The registers 21 associated with a particular level are used only when the Processor is operating on that level. This multiple level redundant register configuration is shown in FIG. 3.

The levels referred to herein are a hierachy of priorities assigned for interrupt handling. In this example, level 0 is assumed the highest level and level 3 the lowest.

Four Accumulators 39 ACCO to ACC3 are provided (1 per level). Each one has 16 bits. Four IAR backups 40 IARBO through IARB3 are provided (1 per level). Each one has 16 bits. This function is to back up IAR 30 on a level-to-level transition and avoid the necessity of IAR saving by software. Each of the Index Registers 41 (XR 1 through XR 7) is reproduced four times on a per-level basis. Each one has 16 bits + byte parity.

Figure 3:
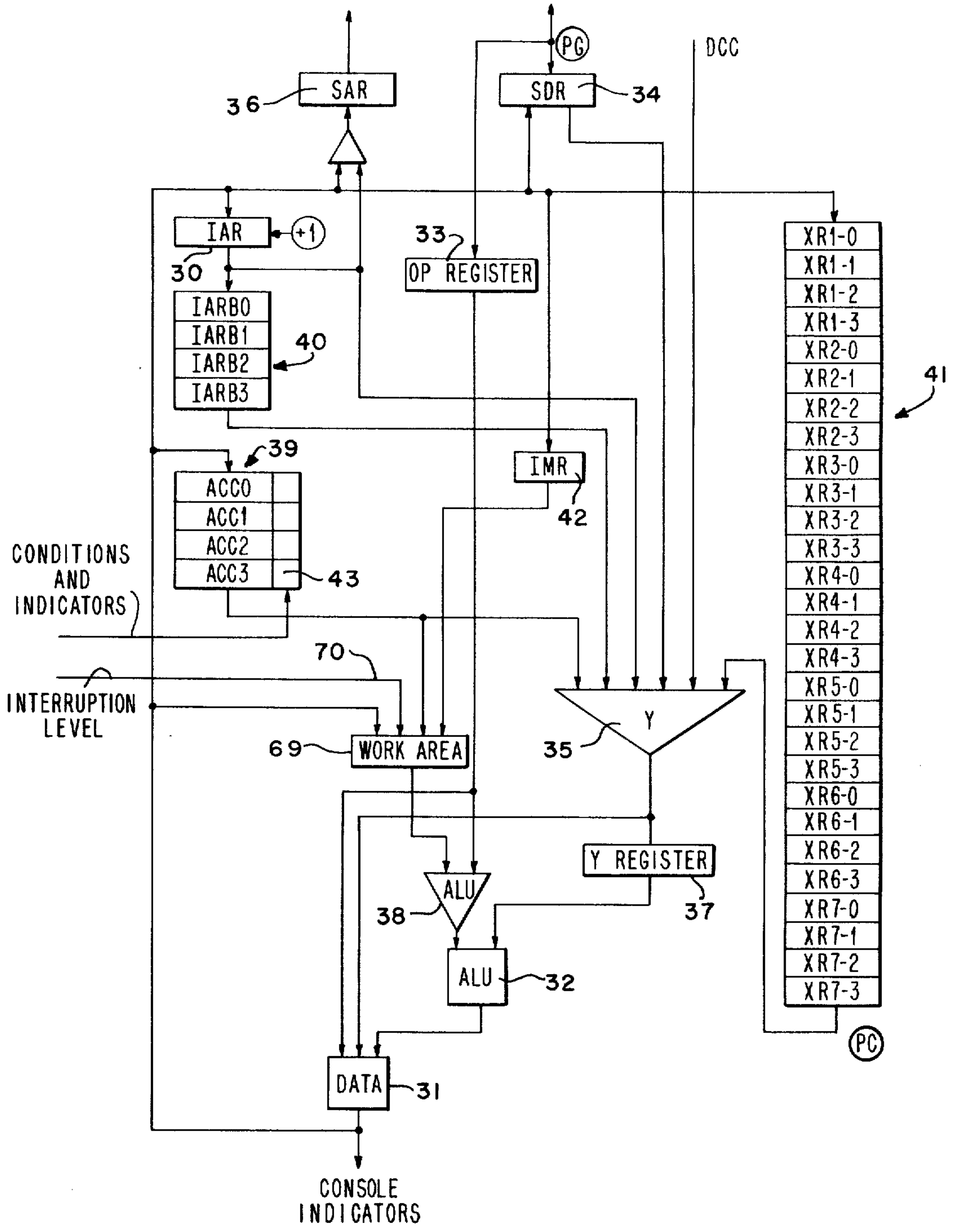
FIG. 3 presents some of the priority level related multiple processor control components that permit a processor in accordance with the present invention to operate as a virtual machine.

As seen in FIG. 3, the Local Array (Index Registers 41) is loaded from the Data Funnel 31 and gated into the Y funnel 35. Parity checking is provided on the array.

Main Storage

The storage 11 used is preferably a monolithic storage. It is organized in increments of 2K words by 18 bits with byte parity, up to a maximum of 16K words. The monolithic storage is magnetic storage compatible and is power volatile. The bipolar monolithic storage unit is also compatible with Processor logic signal levels. The array modules and support modules populate the storage card which contains 2,048 words by 2 bits. Access time and cycle time, measured at the storage card, are 125 nsec and 400 nsec, respectively.

The array module contains four chips or 512 bits. It is a stacked, two substrate module with two chips per substrate.

III. Arithmetic Indicators

Carry Indicator: The carry indicator turns on when an operation has produced a result which exceeds the physical capacity of the accumulator 39. The following three conditions will turn on the carry indicator: (1) on a left shift operation, which is not circular, when the last bit shifted out of bit zero (the sign bit position) was a 1 bit; (2) on an arithmetic instruction when a carry out of Bit 0 (the sign bit) occurs. This may happen regardless of the polarity of the operands involved. When a large negative number is added to a smaller positive number, or equivalently, a larger number is subtracted from a smaller number, the Carry Indicator informs the program of the polarity of the result. Whenever there is no carry, the result is negative and should be recomplemented; (3) on a subtract operation, when a borrow beyond bit zero occurs. The carry indicators are automatically reset prior to each add, subtract, and noncircular shift left operation.

Overflow Indicator: Whenever the result of an add or subtract operation exceeds the capacity of the system (i.e. produce a result which is either greater than $2^{15} - 1$ or less than $-2^{15}$), an overflow condition occurs. The Processor 10 recognizes an overflow condition by observing the carries both into and out of the high-order bit position (the sign position). If the carries disagree, an overflow condition exists. If they agree, no overflow exists. There are four possibilities:

1. No carry in and no carry out. (Carries agree — no overflow).
2. Both carry in and carry out. (Carries agree — no overflow).
3. Carry in, but no carry out. (Carries disagree — overflow).
4. Carry out, but no carry in. (Carries disagree — overflow).

The overflow indicator is reset only when it is tested by either the skip or branch conditional instructions with the Overflow Save Flag (Bit 8) equal to 0, and Bit 15 in the condition mask equal to 1.

The carry and overflow contain the condition code following a PIO instruction. Carry is bit 0 of the condition code and Overflow is bit 1. Carry is also used to hold the summary status bit ('S'bit) on interrupts as described later.

The other indicators consist of zero, even, plus, and minus indicators. These indicators are also set as a result of an arithmetic or logical operation.

IV. Number Representation

All operands are treated as signed integers, where the sign bit is considered the leftmost bit. Positive numbers are represented in true binary notation with the sign bit set at zero. Negative numbers are represented in two's — complement notation with a one in the sign bit. The two's complement of a number is obtained by inverting each bit of the number and adding a one in a low-order bit position.

This type of number representation can be considered the low-order portion of an infinitely long representation of the number. When the number is positive, all bits to the left of the most significant bit of the number, including the sign bit, are zero. Therefore, when an operand must be extended with high-order bits, the expansion is achieved by prefixing a field in which each bit is set equal to the high-order bit of the operand.

Two's complement notation does not include a negative zero. The maximum positive number consists of an all-one integer field with a sign bit of zero, whereas, the most negative number consists of an all-zero integer field with a one-bit in the sign bit position.

V. Priority Interruptions

As mentioned in the Introduction, the method by which a real time system handles priority interruptions is extremely basic to its eventual success. There are many facets to the priority interrupt mechanism of the present invention and these are listed below:

A. Prepare I/O: The operation of this command is described in Section XI. Its contribution to the interrupt mechanism is to provide dynamic allocation and modification on levels and sublevels for interrupting sources and to allow the manipulation of pure device masks.

B. The Set Interrupt command also described in Section XI allows the controlling software to dispatch jobs or subroutines at specified levels; thus, the same priority arrangements available to externally generated interruptions are also available to the software itself. This provides a high degree of flexibility in the dispatching of new tasks.

C. This invention encompasses a multiple level preemptive priority interruption system. The levels assumed for this description are numbered 0, 1, 2 and 3. The smaller the level number, the higher the priority. When the processor is not executing at any one of these levels, then the processor is in the wait state. An interrupt mask register IMR 42 (not FIG. 3) is provided in the system with a bit position for each of the four interrupt levels (see Description of PNM, POM, PSLM in Section X). The contents of this mask register 42 can be manipulated by the software. A one bit in a given level position in the mask register 42 permits an interrupt to occur on that level. A zero bit prevents this. Thus, the software has the capability to control interruptions on a per level basis. In addition, a summary mask bit is provided in the IMR 42 which is also capable of being manipulated by the software and, if a zero, prevents all interruptions. A one bit in this summary mask allows those interruptions which are in turn enabled by the mask register 42. The algorithm used to determine priority allows for the interruption of the current level by a level which is higher in priority providing this new level is enabled by the summary mask and the mask register. Thus, for instance, if level 2 is operating, it may be interrupted by level 1 or level 0 but not by level 3 or a new interruption on level 2. Unless preempted by higher levels of interruption, the routine running at a given level will complete. A routine is completed when the programmer issues the level exit instruction (see Section X). When this instruction is encountered, the processor 10 determines whether any lower levels are already pending and, if not, goes to the wait state to wait for new interruptions. When a lower level routine is executing and is preempted by a higher level routine, its status is retained in the system and when the higher level routine has completed execution, the system returns to the lower level at the point of interruption, the lower level then proceeds to completion providing no new interruptions occur.

D. For each of the four levels, 16 sublevels are identified. These are numbered zero through F. There is no inherent relative priority differences between sublevels of a given level. The sublevel information is used to identify the source of interruption to the hardware in order that the correct hardware assisted linkage to the service routine may be performed. See the Section on Automatic Sublevel Branching below.

E. Interrupt Presentation: The direct control channel 12 (note FIGS. 1 and 6 in particular) houses the interrupt presentation mechanism. There is one interrupt buffer register 46 and one interrupt request latch 47 for each of the four levels. All priority interrupts must pass through this buffer. When an interrupting source such as the "device" 48 shown in FIG. 7 wishes to present an interrupt request, it contacts the direct control channel 12 either natively (note the Native Devices, etc. attachment 49 in FIG. 6) or over the internal interface 50 of FIG. 7 and informs the channel 12 of its level. If the buffer 46 corresponding to that level is not already full, the channel 12 accepts the level information and requests additional information from the device which is then placed in the buffer 46. The buffer 46 at this time becomes full and the interrupt request latch 47 corresponding to the buffer is turned on. The information held in the buffer 46 consists of the sublevel, the device address, the module address and a summary status bit which will be described later.

Figure 6:
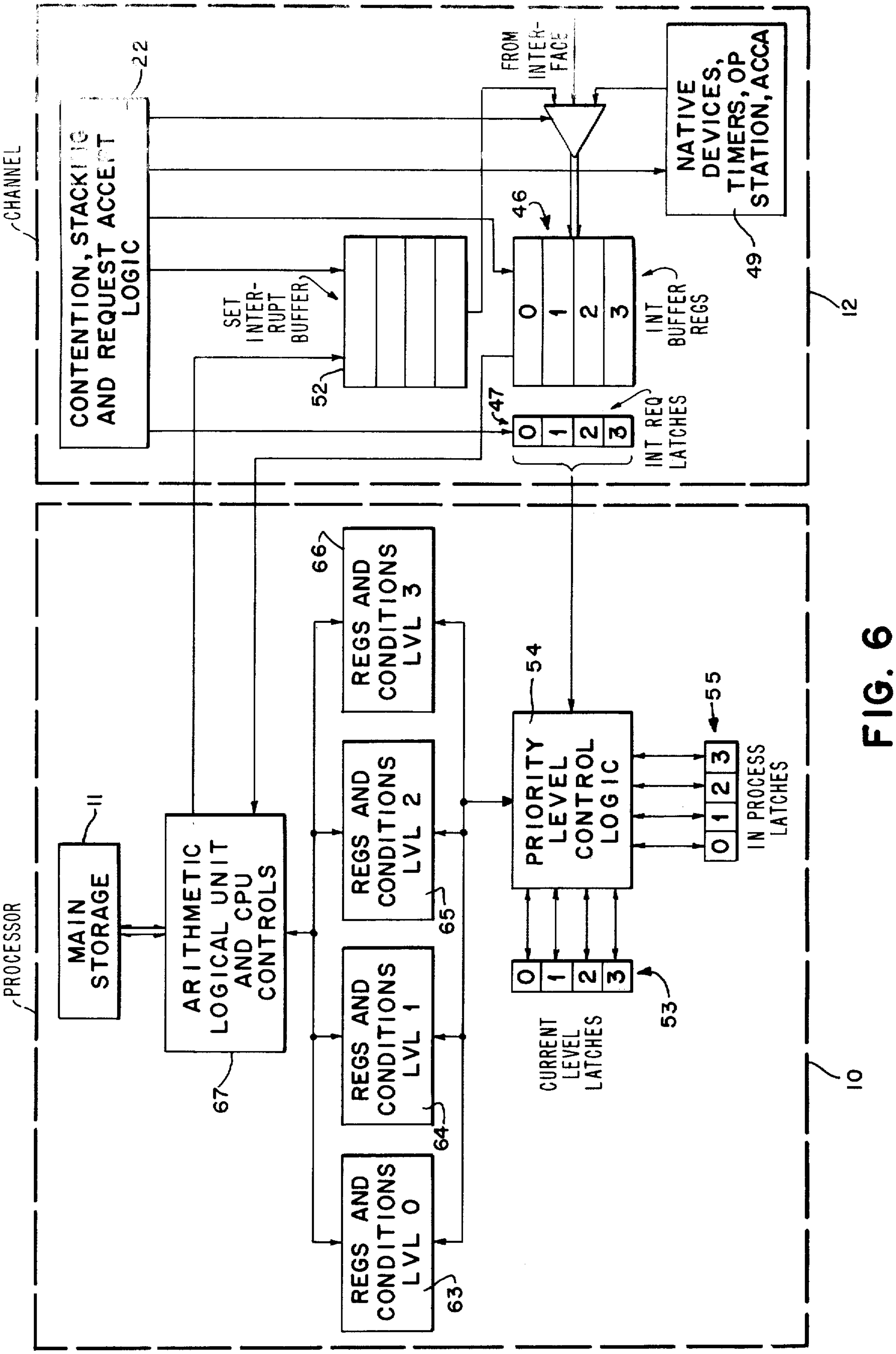
FIG. 6 depicts some of the major components associated with interfacing between a processor, a direct channel control and some channel connected I/O type devices.

If at the time of request the buffer 46 for that level was already full, then the request will be stacked. The interrupting source will be informed via setting of its Stack Latch (note 51 in FIG. 7) that it must retain its interruption condition until instructed to again present it by the direct control channel 12. The signal soliciting a renewal of the presentation of stacked interrupt requests for a given level is issued automatically by the direct control channel 12 when the buffer 46 for that level is emptied during the acceptance of that particular interruption by the processor 10. The four interrupt request latches 47 (shown in FIG. 6) associated with the four buffers 46 are one group of the three groups of latches which control the priority interrupt mechanism in the system. Program set interrupts and interrupts arriving from another processor are handled in a similar fashion. In the case of program set interrupts, however, an additional buffer noted as the Set Interrupt Pre-Buffer 52 in FIG. 6 is provided in case the buffer 46 for the selected level is full. This insures that at least one program set interruption at the specified level will occur following the issuance of a set interrupt command. The processor 10 samples the four interrupt request latches 47 which are sent from the direct control channel 12 before the end of each instruction and continuously if during the wait state. The current interruption status of the processor is retained in a second group of four latches which are shown as the current level latches 53 in FIG. 6. Only one of these latches may be on at any one time. If none of the latches 53 is on, the system is in the wait state. The function of the current level latch 53 is to indicate which level the processor is actually executing at any given instance. Incoming interrupt requests are compared by the processor with the memory mask, with the individual level mask in the mask register and with the value of the current level latch 53. If the interrupt is enabled by the masking facilities and if it is of higher priority than the current level, then the Priority Level Control Logic 54 will effect a level switch to the new level at the end of the current instruction or immediately, if the system is in the wait state. The third group of four latches 55 mentioned previously are the In Process Latches 55 of FIG. 6. Their function is to indicate those levels on which the processor is either currently executing or which have been preempted due to higher priority execution. To prevent, for instance, level 2 from interrupting level 2, no new request will be accepted on the level for which an in-process latch 55 is already on.

When a new interruption on level X is accepted by the processor 10, the current level X latch 53 is turned on and the in-process latch X 55 is turned off. Notice at this time that the request latch 47 in the direct control channel 13 for level X is reset and its buffer 46 is emptied. This condition is signaled to all interrupting sources which are stacked on level X and the first one to capture the interrupt buffer 46 will then be accepted. This operation is described in the concurrently filed application entitled, "Interface Multiplexer," by Patrick and Rickard assigned to the same assignee as this application. Any other requests on the same level will again perform a stack. If the processor operating on level X is interrupted by a level higher than X, then the in-process latch 55 will remain on but the current level 53 will switch to reflect the new higher level execution. When this new high level terminates, the processor will scan the in-process latches 55 and will note that the level X in process latch 55 is on indicating that X has already been preempted but execution has started. In the absence of any further higher priority interruptions the processor will resume X at the point where it was preempted and carry it through to completion. At this point the in-process latch 55 for X and the current level latch 53 for X will be turned on.

F. Status Saving. Certain parts of a central processor 10 are visible to the program which is executing in that processor. These portions will be referred to as program addressable. They typically consist of the registers which the program can manipulate or use and conditions which the program may set and test. One of the most important registers is the one which counts the instructions through which the program has stepped and is commonly called the instruction address register. Other parts of the processor are not program addressable and include special working registers which the hardware uses but to which the software does not have access. Such registers are available to the arithmetical and logical unit and a large number of control and clocking facilities. When an interruption occurs, it has been known to store the value of the instruction address register by hardware. The software must then store the contents of all of the program addressable registers and conditions. It must then load its own values and proceed to termination at which point the interrupted values must be restored. This saving and restoring of the program addressable section of the CPU represents a considerable elapse of time which is one of the components of the overhead of taking an interrupt but which is avoided by this invention.

The approach of the present invention to this problem is to duplicate in hardware the program addressable portions of the CPU; therefore, an accumulator 39, seven index registers 41, an instruction address register 40 and a set of indicators 43 are provided for each interrupt level. Status switching on an interruption is then simply a matter of switching to the appropriate bank of program addressable data. This allows very rapid status switching on the system and also provides a high measure of integrity in that the status information is saved and restored by hardware and one program is not dependent on another program to restore and save its own status.

In addition to performing the status save and load during the acceptance of an interrupt, the system also introduces the new status pertinent to the current interruption. This status is made automatically available to the routines to which an interrupt is taken and saves the time-consuming solicitation of status from I/O devices. The sublevel device address and module address are loaded into the accumulator 39 of the level to which the interrupt is granted and the S bit is loaded into the carry indicator 43. The S bit is a single bit summary status indicator 56 developed in the Device 48 of FIG. 7 by monitoring all device status indicators as stored in the Status Register 57. If the S bit is a 0, then the interruption is due to a normal termination condition at the interrupting device. No further status information is required and the device is immediately available for reinstruction. If the S bit was a 1, then an errant or exception condition have occurred and program is directed to acquire a detailed status description by requesting status presentation from the device. The S bit may be tested by one 400 ns instruction and contributes to the responsiveness of the system by allowing in the general case for this one instruction to replace the solicitation of status and its subsequent analysis in order to determine that a normal ending condition has occurred.

G. Automatic Sublevel Branching. A further reduction of overhead associated with interrupt switching is realized through automatic sublevel branching. Referring to the FIG. 5 diagram of processor storage allocation, it will be noted that location 08-OB hexadecimal contain table pointers for start instruction address (SIA) tables for each of the four levels. The contents of any one of these fixed addresses points to a table of start instruction addresses for the various sublevel values within that level. The sublevel may therefore be regarded as displacement added to the base provided by the contents of the fixed location. When an interrupt occurs at level X sublevel Y, the processor in the course of handling the interruption accesses one of the four fixed locations which corresponds to level X. It adds the value Y to that address and accesses the appropriate level sublevel combination in the appropriate SIA list of the level table. The data resulting from this storage access is loaded into the instruction address register and is the address of the first instruction of the service routine for level X sublevel Y. Here again a hardware function takes the place of software analysis and provides for rapid interrupt handling, thus further increnasing the system responsiveness. Note in FIG. 5 that OIA means Old Instruction Address.

The combination of multiple registers per interrupt level, the provision of the identification of the interrupting source, the provision of summary status and the automatic sublevel branching permit a status switch to occur within an elapsed time of 800 nanoseconds between the end of the interrupted from instruction and the beginning of the interrupted to instruction. Further definition of the defined location in storage for interrupt purposes is given below.

As mentioned, reference to storage addresses is in Hexadecimal notation. Addresses 2–7 are not assigned in the FIG. 5 example shown but locations 0 and 1 are reserved for the restart instruction. It is to this address that a forced branch is made following the hardware part of the initial program load IPL. Locations 08, 09, OA and OB hold the start instruction address pointers for levels 0–3 respectively. These pointers are the base addresses of the level displacement tables. The first word of each level displacement table is the Program Check old instruction address PROG OIA for that level. The remaining 16 words are the start instruction addresses for level X displacement 0 through level X displacement F. The table need only be as long as required by the assignment of displacements. Storage locations OD through OF contain, respectively, the Program Check start instruction address PROG SIA, Power/-Thermal Warning start instruction address PWRF SIA and Machine Check start instruction address MCK SIA. These are the addresses of the first instruction in the respective routine and are called class vectors. In locations 10 and 11 are the Power/-Thermal Warning old instruction address PWRF IOA and the Machine Check old instruction addresss MCK IOA, respectively.

VI. Class Interrupts

In addition to the four priority interrupt levels, three Class Interrupts exist in the Processor. These are: Program Check, Machine Check, Power/Thermal Warning. These interrupts cannot be disabled. Each interrupt level provides a storage location for storing the IAR in the event of a Program Check interruption. Therefore, Program Check interruptions can occur and be serviced on each level. Since Machine Check and Power/Thermal Warning interrupts are machine wide conditions, successive interruptions in either of these two classes will be handled recursively.

When a Class Interrupt is taken, all priority levels are automatically disabled by the hardware and must be re-enabled if desired by the program. The interrupt mask is not changed and the priority levels are re-enabled by the program issuing the POM or PNM instruction. When a Class Interrupt occurs, any any register save (except IAR) is the responsibility of software. On Program Check Interruptions, the instruction is not executed and none of the program addressable internal registers of the Processor are changed.

A Program Check interrupt causes the address of the instruction which caused the error to be stored in the Program Check old instruction address for that level (e.g.: in PROG IOA Level 0) and the Program Check start instruction address to be loaded into IAR and execution to begin. A program check occurs on illegal op code functions and modifier values, on invalid shift count values and when the fitted storage size is exceeded by instruction fetch or operand access.

When a Machine Check interrupt occurs, the saved instruction address is the address of the instruction which was being executed when the interruption occurred. A machine check occurs on register or storage parity errors, and on hardware malfunctions of the controls of the processor, channel or interface.

On a Power/Thermal Warning interrupt, the saved instruction address is the address of the next instruction. Power/Thermal Warning interrupts are allowed only between instructions. The condition occurs when primary power starts to fail or when an overtemperature condition exists in the system. Sufficient advance notice of these conditions is provided to allow an orderly shutdown of the system.

VII Operation

Having previously described many of the components and instructions involved in this invention, a general description of the operation thereof will now be considered. The generalized system configuration as shown in FIG. 1 of a data acquisition and process control system in accordance with this invention is intended for minimum time lapse in responding to demands provided by the user devices 14 and 15 attached to the I/O modules 16 and 17. These I/O modules are coupled to a common interface into a direct control channel 12 to permit data exchanges with the processor 10 and storage 11. Storage 11 in the processor module can be either accessed on a storage to storage type interchange with a host processor through the host attachment 13 or can communicate with other data processing equipments through a communication adapter 18 (ACCA) in which case the exchanges are handled on an interrupt basis somewhat similar to the I/O modules. Interval timers 19 are separately included in the processor module to permit them to perform their timing functions autonomously and relieve the processor of the software burden required for this function. The operator station 20 permits the user to communicate with the processor module typically through keyboard, paper tape or the like.

Figure 5:
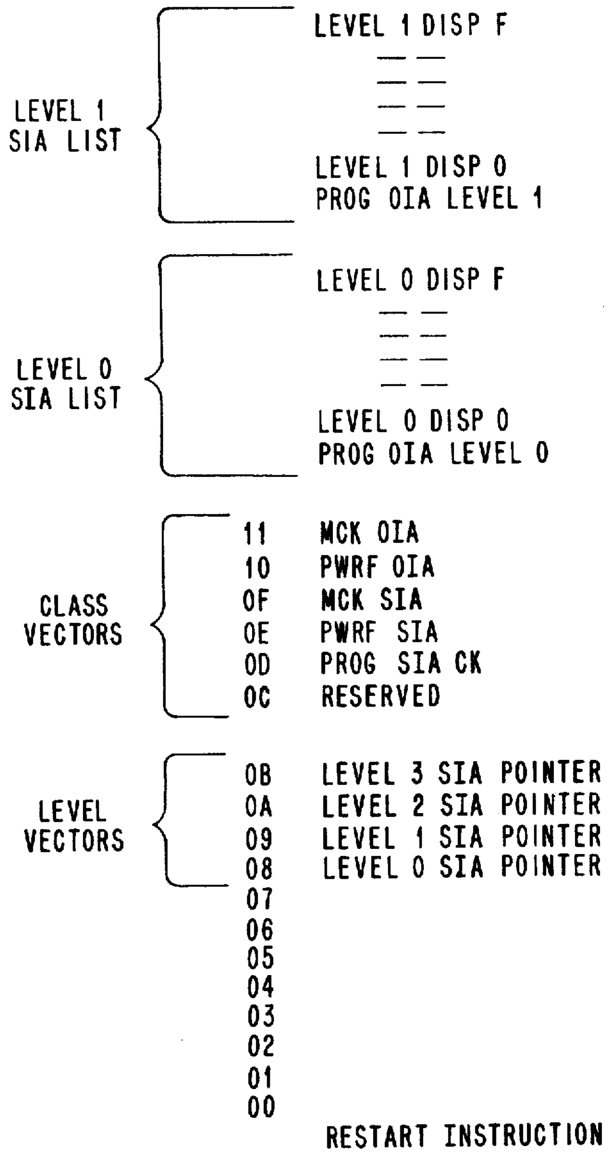
FIG. 5 contains a typical arrangement of a portion of the processor storage which can be addressed to retrieve subroutines for providing servicing responses to various interrupt originated control signals.

Through either the host processor interchanges or the operator station interchange, the processor module storage 11 is initialized by placing supervisory type program defining the tasks to be performed therein and also placing the various storage allocations for level and sublevel processing as shown in FIG. 5 in storage. The processor module is then ready to begin initiating and controlling the multiple tasks to be performed by the user devices. These tasks can require various combinations of digital data input and output as well as analog data input and output although the latter functions require the conversion of the analog levels to equipment digital levels for handling by the processor before presentation to the internal interface.

Figure 2:
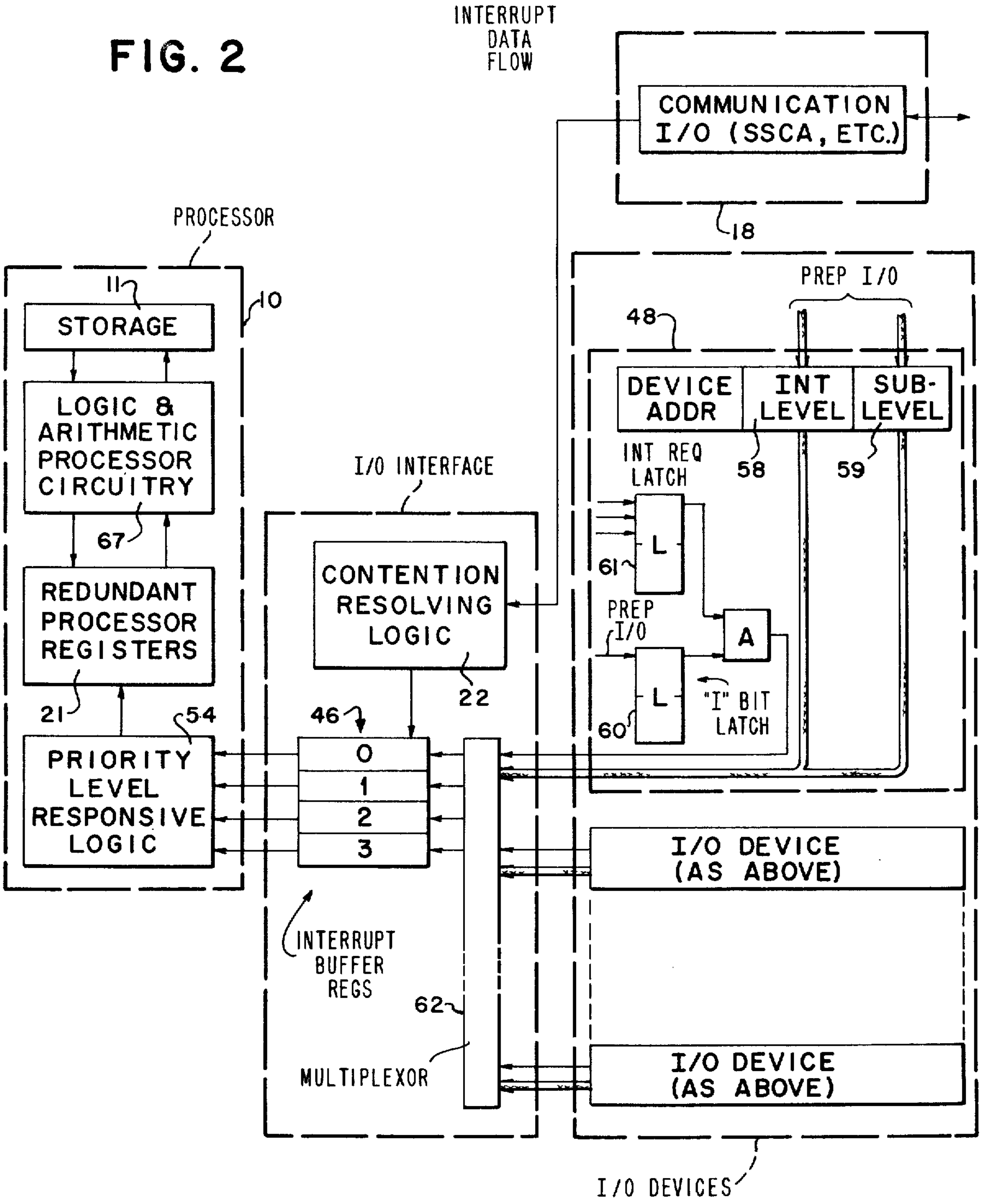
FIG. 2 illustrates the interrelationship of some of the features of the present invention particularly with respect to the assigning, handling and device masking of interrupt service requests using priority allocations.
Figure 7:
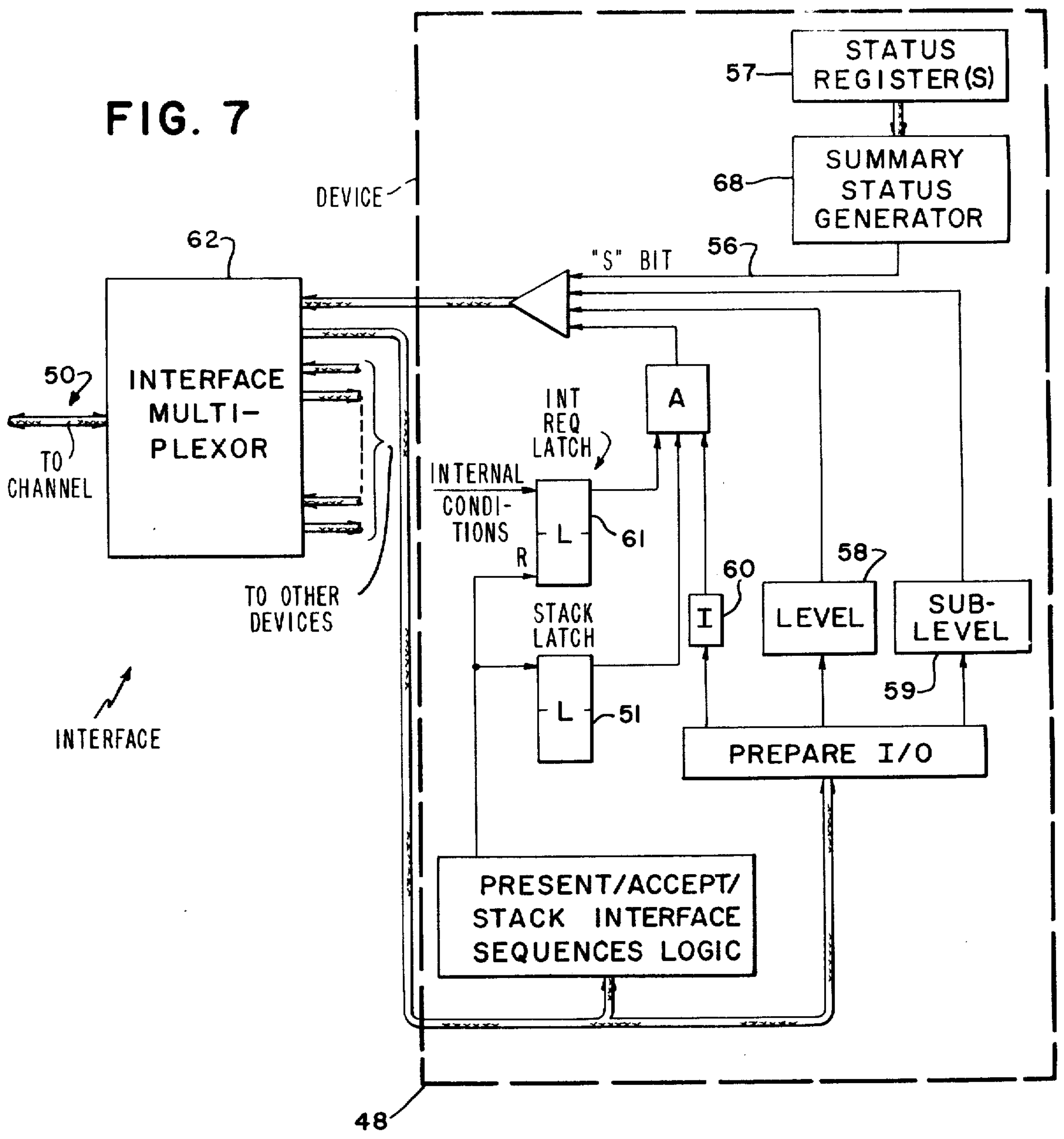
FIG. 7 sets forth some of the components in one typical I/O device and correlates its interrelationship with the interface multiplexer and FIG. 6 circuitry.

The processor 10 can then commence initializing the various I/O modules by addressing the particular I/O devices as shown in FIGS. 2 and 7 and transferring a prepare I/O instruction which will cause the device to store various information concerning its ability to present interrupts to the processor. This includes a field which defines the interrupt level that is stored in the INT LEVEL register 58 shown in FIGS. 2 and 7. The displacement corresponding to the address of the particular processor subroutine that would service the interrupt generated by that device is stored in the sublevel register 59. There is also included a one bit mask at the device which will either permit or not permit interrupts to occur, this being the "I" bit that is stored in the I bit latch 60.

Upon occurence of a condition at the I/O device, which requires an interrupt, the device will set its interrupt request latch 61 as shown in FIGS. 2 and 7 which, assuming that the I bit has been set previously at the device and the stack latch 51 is clear, will permit the device to compete into the interface multiplexer 62 for interrupt processing. This interface multiplexer 62 can be in accordance with the concurrently filed application entitled, "Interface Multiplexer," by Patrick and Rickard which has advantages in providing fast response to interrupts while preventing any particular device from dominating the interface. The direct control channel 12 will recognize whether or not the interrupt buffer register 46 associated with the level assigned to the service-requesting device is clear. If so, the address sublevel and summary status associated with that particular device will be stored in its interrupt buffer register level 46 and the interrupt request latch 47 associated with that buffer will be set. The device is then effectively competing at the processor level for servicing as a function of its priority level. Conversely, if the interrupt buffer register 46 corresponding to the level of the requesting device has already been filled, the device will be directed by the interface multiplexer 62 to set its stack latch 51, clear its interrupt request latch 61 and relinquish the interface. Whenever the interrupt buffer register 46 associated with that particular level is cleared by the processor, the interface multiplexer 62 will broadcast to all devices who have had their stack latch 51 set to permit them to again raise their interrupt request latch 61 and compete for servicing.

At the processor, the priority level control logic 54 will response to the loading of the interrupt buffer registers 46 and setting of the associated interrupt request latches 47 only if the requested level is enabled and there is no current interrupt being processed at the same or a higher priority level. As mentioned previously, the current level latches 53 and in-process latches 55 which are associatied with the different priority levels will indicate to the priority level control logic 54 both in the particular interrupt level which currently is being processed and which other levels have been previously interrupted and require a return for ultimate servicing to completion.

As seen in FIG. 6, the priority control logic 54 responds to the highest level interrupt request present to actuate the registers and conditions 63–66 associated with that level to the exclusion of the other levels. In the example given, this means that the registers and conditions circuits 64-66 associated with levels 1, 2 and 3 would all be effectively disconnected from the arithmetic, logical unit and CPU controls 67 while only level 0 would be connected if a level 0 interrupt request were present. FIG. 3 particularly illustrates the components associated with the registers and condition circuits 63–66 of each level. That is, in the presence of a level 0 interrupt request, the ACC 0, all zero level XR registers 41 and the IAR for level 0 would be actuated while all other registers which are associated with lower levels would be temporarily suspended. The operation of the ALU and the storage addressing is generally similar to that performed by prior central processing units although there is also included a special mask register 42 to permit masking individual interrupt levels or masking all interrupt levels. This means that the system in accordance with the present invention effectively has six different criteria that can be used for masking interrupts in that interrupts from a specific device can be masked through the I bit, interrupts from particular levels can be masked through the IMR 42 and all interrupts can be masked. Further, these masking functions can be dynamically changed through software manipulation which therefore provides an extremely high degree of flexibility for this system and permits the system to respond to changing conditions. For instance, if a particular I/O device is critical during short periods of time in a given day but can be ignored at other times, the device can be set up with an interrupt level 0 through the prepare I/O instruction at the beginning of the day but the I bit latch 60 can be left clear. For these conditions, the device cannot present any interrupt requests. The programmer can then generate a prepare I/O instruction at the beginning of the critical time period for that device merely to set the I bit latch 60 after which the device will compete on its level 0 interrupt priority. This I bit latch 60 can be cleared at the end of the critical time period effectively suspending operation of that device. Alternatively, the prepare I/O instruction can be initially generated with a relatively low interrupt level but with this interrupt level changed to the level 0 for the period of the critical time.

The operating speed is further enhanced by obviating mandatory collection and analysis of device status. This is delegated to the device itself through its summary status generator 68. The use of the "S" bit 56 which summarizes whether or not a status solicitation and analysis is required permits the procoessor to bypass this time burden when it is not necessary by simply adding the S bit to the data transfer through the buffers on the interrupt request.

The storing of the sublevel index disposition at the device which is then transferred to the processor still further relieves the processor of time burden since the processing of the interrupt permits the process immediately to reference the particular subroutine that will handle the originating device's service request.

In the processor, the work area 69 in the example shown is a 16 bit logic circuit which provides one of the inputs to the ALU funnel 38. Data is set into the work area 69 from any of four sources. These include one of the accumulators 39 storing arithmetic or logical operations, an index register 41 during load index long operations, the mask register 42 during OR-to-mask or AND-to-mask operations, and the mask register and the binary encoded current level during sense level and mask operations. The work area 69 is also actuated by an interruption level indication signal 70 from the interrupt level and priority control circuits 54. Parity can be generated (PG) or checked (PC) wherever desired although preferably at the location indicated in FIG. 3. The specific data busses used to transfer data between the processor and the devices has not been shown since this operation through the interface multiplexrer 62 is generally well known. Only the portions associated with interrupt processing and with the device detecting and responding to prepare I/O instruction has been specifically shown in FIG. 7.

The processor can perform various background programming functions by setting the set interrupt prebuffer 52 of FIG. 6 so that its background effectively competes on an interrupt level with the other devices. Typically this background processing would be a low level of priority although, under critical circumstances, the programming can be set up so that only the background processing would be performed, if desired. The native devices 49, timers 19, operation station 20 and communications adapter 18 (ACCA) can also be dynamically set up in accordance with the prepare I/O operation of the devices.

Note in FIG. 3 that only the IAR register 30 is shown as being incrementable by one (+1). To avoid duplication or switching of circuitry normally associated with the address register operation, the selection of a priority level for servicing can be accompanied with a transfer of the contents in an appropriate backup address register IARB 40 into the IAR 30. Although the backup register for level 0 (IARBO) would generally not be needed since level 0 cannot be interrupted by any other level, IARBO can be used to hold the level 0 IAR upon occurrence of a class interrupt. Another use for IARBO would be to retain the address of the instruction actually being executed.

Figure 9:
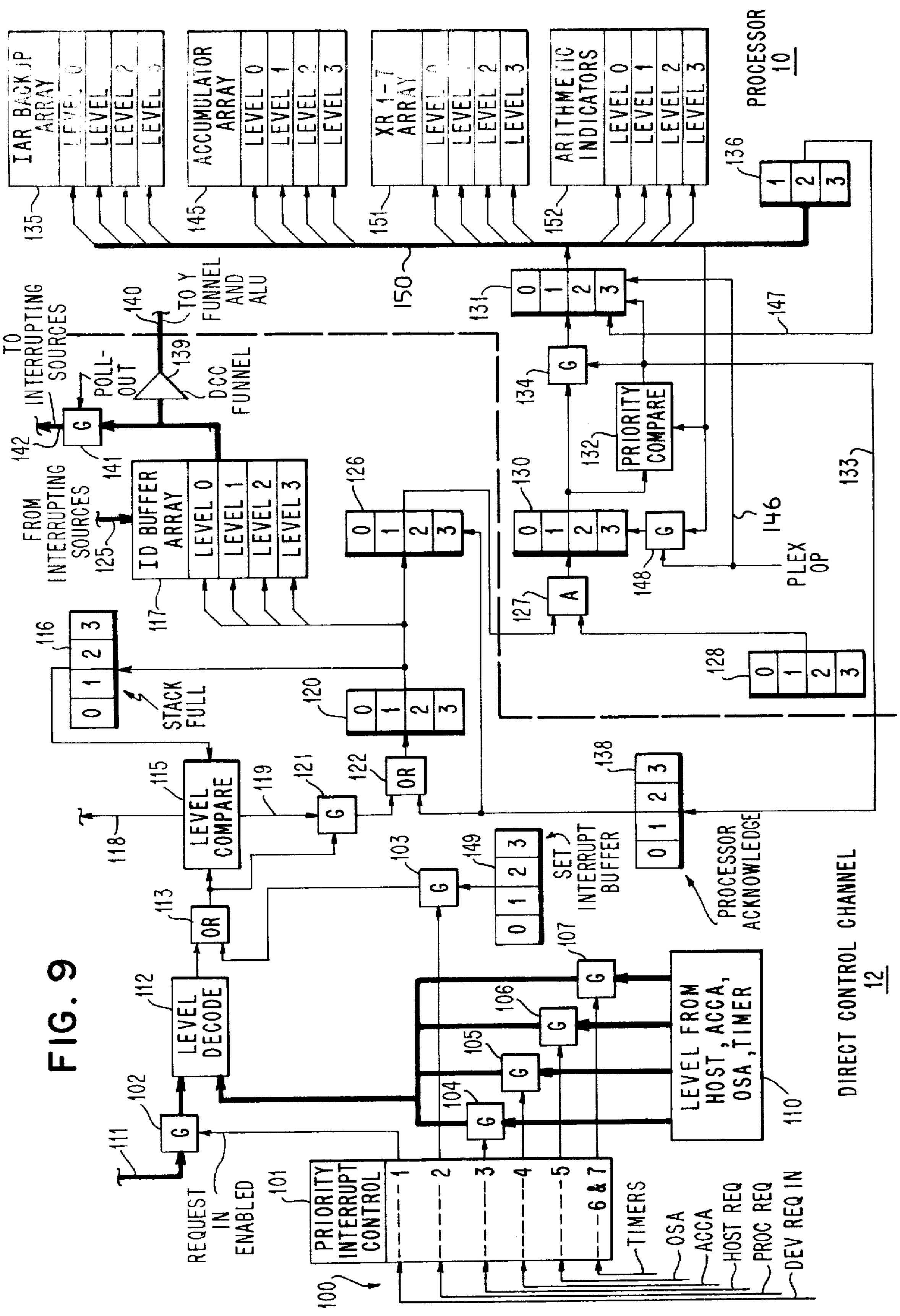
FIG. 9 illustrates an arrangement of logic circuitry for handling multiple level interrupt priority request signals within the direct control channel and processor.

FIG. 9 shows an arrangement of logic circuitry for enabling interrupt requests as received by the direct control channel 12 and responding to those requests with either acceptance or stacking sequences. In addition, FIG. 9 shows the logic circuitry associated with processor 10 for controlling the virtual machine environment. Thus FIG. 9 presents implementation detail generally correlated to the preferred embodiment as described in particular in FIGS 2, 6 and 7 previously.

The various devices and attachments which require interrupt servicing present their interrupt requests by signals at interface 100. These requests include the interrupt request from the attached devices (DEV. REQ. IN) which are presented by the interface multiplexer 62 of FIG. 7. Also included is a processor set service request (PROC. REQ.) which is the processor originated service request shown as being loaded into set interrupt buffer registers 52 of FIG. 6. The host attachment likewise can present a service request (HOST REQ.) which could originate from host attachment 13 shown in FIG. 1. Other devices presenting requests include the communication attachment ACCA, the operator station attachment OSA and timer service requests. Contention amongst these various requests is resolved by priority interrupt control circuit 101 which enables interrupt requests in the priority order as shown in the diagram. That is, the internal interface requests have the highest priority whereas the timers have the lowest priority. Once control circuit 101 has enabled a request, it remains enabled until accepted or stacked by the direct control channel 12. In the meantime, no other requests can be enabled even if they occur at a higher priority.

Since the I/O interface multiplexer is assigned the highest priority for handling device request input signals and since this multiplexer can have a multiplicity of service request originating devices attached to it, it may be desirable to avoid complete dominance of the interrupt servicing by the device request input in the priority interrupt control circuit 101. Thus, it may be desirable to include circuitry within control 101 so that the interval interface (DEV. REQ. IN) is given first priority unless a previously enabled request was also from that interface in which event it is granted last priority. More particularly, controls 101 can include an arbitrator latch which is set when an interface request originating from a device has been enabled. Such a latch would block the next interface request from the I/O multiplexer so that a request from one of the other interrupting sources can be enabled. This latch could be cleared if there is no other interrupt request present or after a preselected timeout.

In any event, control circuit 101 based upon the hierarchy of priorities as shown and the criteria as discussed will enable one and only one of gates 102 to 107. Bytes of data corresponding to the level of the interrupting source are presented by the host, ACCA, OSA or timers as shown generally in block 110 or from the I/O interface multiplexer as shown as data bus in 111. The level of the interrupting source which is enabled is decoded by level decode 112 and compared in level comparator circuit 115 with the stack full latches 116. An active stack full latch 116 for the level corresponding to decode 112 output means that the interrupt data (ID) buffer 117 for that level contains interrupt information. An inactive stack full latch 116 for that level means that buffer 117 for the level is empty. If comparator 115 detects that the stack full latch 116 for the decoded level is active, a signal 118 is returned to the interrupting source to indicate that it should stack its request. More particularly, such a signal is returned to the device of FIG. 7 so as to rest its interrupt request latch 61 and set its stack latch 51. That is, a favorable comparison as between the output of OR 113 and the contents of the comparative latch in latches 116 results in the stack signal 118. Conversely, if the stack full latch 116 for the decoded level is detected as inactive by comparator 115, an accept or no compare signal is generated on line 119 so as to set the appropriate level in level latches 120 via gate 121 and OR 122.

Level latch 120 addresses the ID buffer 117 so that the identification of the interrupting source can be set into the proper buffer position from the interrupting source as presented at input bus 125. The level latch 120 also sets the corresponding stack full latch 116 and the interrupt request latch 126 which corresponds to interrupt request latches 47 of FIG. 6. Note also that the interrupt buffer registers 46 of FIG. 6 correspond to the ID buffer array 117 of FIG. 9.

The contents of latches 126 representing interrupt levels that have been accepted by the channel 12 are presented to processor 10 where they are compared with the contents of mask register 128 via AND circuits 127. That is, the level present in 126 is gated to another interrupt request storing set of latch 130 if the mask bit for that level is active in register 128.

The status of request latches 130 are continually compared with the current level latches 131 in priority comparator circuit 132. When a request latch 130 is set for a higher priority than the current level 131, a priority interrupt occurs and the processor sends an interrupt request acknowledgement over line 133 to channel 12. Then processor 10 (1) moves the IAR contents to the IAR backup register 135 selected by the current level, (2) moves the current level 131 to the appropriate in-process stack latch 136, and (3) sets a new current level 131 equal to the priority level. As is well known to those familiar with the prior art interrupt configurations, this priority interrupt is controlled by the processor timing so as to occur at a point that will not degrade the processor operation which is then in process but about to be interrupted. Generally this point is reached at the completion of a given instruction execution as has been discussed previously herein.

When channel 12 receives an interrupt request acknowledgement 133, it sets the corresponding processor acknowledged latch 138. This latch resets the interrupt level latch 126 and sets the level latch 120 to the level address of the ID buffer 117. Buffer 117 contents are then gated to the processor 10 through the channel funnel 139 and thence over bus 140 to the Y funnel and ALU circuitry of processor 10. By a poll out signal enabling gate 141, channel 12 signals over output 142 to all interrupting sources that the buffer 117 is empty for that level.

Processor 10 generates an interrupt routine address using the displacement or sublevel portion of the interrupting source's identification as is illustrated and described hereinbefore particularly with respect to FIG. 5. The processor 10 also stores the interrupting source identification in the appropriate level of accumulator array 145.

If no interrupt requests occur at a higher priority than the current level as reflected in latches 131, processor 10 continues to operate on the current level until a level exit (PLEX) instruction is issued by the program. The PLEX operation as reflected by input 146 resets the current level in latches 131 and the corresponding interrupt request latch 130 if this latch is not previously reset. If any of the in-process stack latches 136 are active at that point, the current level 131 is set to the one with the highest priority in latches 136 via 147. That is, the concurrence of the PLEX input 146, one of latches 136 being set and the lack of a higher priority level being present in 130 will cause the transfer of the highest level latch 136 to the current level 131. The address in the IAR backup 135 for that level is moved to the IAR and the processor 10 begins executing instructions.

If no current levels are stacked in in-process array 136, processor 10 enters the wait state but immediately leaves the wait state if any interrupt request latch 130 is active. If not, processor 10 remains in the wait state until an interrupt request latch 130 is set. When more than one interrupt request latch 130 is active, processor 10 acknowledges the one with the highest priority.

When the ID buffer 117 is full for the level of an interrupt request enabled from controls 101, channel 12 signals the interrupting source to stack its request via output 118 of comparator 115 as mentioned. The stack latches equivalent to latch 51 of FIG. 7 for the host attachment, ACCA, OSA and timers can be contained directly in channel 12 since each of them represents only a single potential interrupt source. Therefore, when a request from one of these devices must be stacked, the channel 12 merely sets the appropriate stacks latch (not shown) within channel 12. However, to stack a request that was generated by an interrupting source from a device on the internal interface, channel 12 must generate an interface sequence. This sequence is started with an acknowledge out signal to the device from channel 12 with the output data bus being set so as to present a command to the device indicating that it is to be stacked. No interface multiplexing is required because the proper interface path is already selected as a result of the request in from the interrupting source.

When the interrupting source receives this stacking command, it sets its stack latch (latch 51 of FIG. 7) and resets its request active latch (latch 61 in FIG. 7) after detecting the presence of this command at its interfacing logic. The interface is then free to gate a request from another interrupting source to the channel 12 through multiplexer 62 (FIGS. 2 and 7). A stacked interrupt request remains stacked until the channel issues a poll-out on the level of the stacked request.

When processor 10 acknowledges an interrupt request, the contents of the ID buffer 117 position for the ackowledged level are gated to processor 10. Thus that ID position in buffer 117 is free to accept another interrupt. Channel 12 signals all interrupting sources with a poll-out tag and the binary encoded level via gate 141 and output 142 with this output indicating that the buffer for that level is empty. All interrupting sources that are stacked on the level being polled reset their stack latches and again attempt to present their interrupt request. The first request to be enabled by channel 12 is accepted and any other requests enabled on that level are stacked.

The poll-out to interrupting sources on the internal interface accomplishes two things. First, as described above, any interrupt stacked on the polled level is unstacked. Secondly, the poll-out gates the sub-address and module address as well as the level to the data bus out. This signals the interrupting source whose identification was in the ID buffer 117 that its request has been acknowledged by the processor. When the source recognizes its level and address, it resets busy and is again able to accept I/O commands from processor 10.

As was discussed in FIG. 6, processor 10 can itself set interrupt requests such as for having programs executed beyond or in addition to the program then being processed. This processor set interrupt is loaded into buffer 52 of FIG. 6 with interrupt level, sublevel, identification data wherein the interrupt level results in the setting of register 149 in FIG. 9 and the raising of the processor request PROC. REQ. into controls 101 at interface 100. Since the processor identifies the interrupt level of its request, it need not be decoded but is gated directly through gate 103 and OR 113 from register

149 when gate 103 is enabled by priority interrupt controls 101. Otherwise, the processor set interrupt is handled the same by the interrupt handling logic shown in FIG. 9 in that the data loaded into the set interrupt buffer 52 of FIG. 6 is ultimately produced at input 125 in FIG. 9 for loading into ID buffer array 117. Array 117 corresponds generally to array 46 of FIG. 6 whereas register 126 in FIG. 9 corresponds to the latches 47 of FIG. 6. As mentioned previously, current level latches 131 of FIG. 9 correlate to latches 53 of FIG. 6 while the stacked in-process latches 136 compare to latches 55 although no 0 level latch is shown for latches 136 since this is the highest priority level and presumably could not be interrupted. The output of the enabled current level latch 131 is passed though a bus 150 to permit operation of the various processor-related elements 135, 145, 151 and 152 which correspond to one and only one of level 0–3. Note that IAR backup array 135 of FIG. 9 corresponds to array 40 in FIG. 3, accumulator array 145 corresponds to array 39 of FIG. 3, index register array 51 corresponds to registers 41 and indicators 152 correspond to array 43. Thus, it is apparent that appropriate connections are provided between registers 131 and the aforementioned arrays 135, 145, 151 and 152 so that one and only one of the four levels shown are active at any given time while the remaining or inactive levels are simply in a data retaining state. That is, the connections through interface 150 from current level latch 131 are connected to appropriate enabling gates or the like so that the enabled level registers form a complete CPU configuration with the other ALU and logic circuitry and processor storage while the inactive regsiters are completely isolated until their level is enabled by an appropriate one of registers 131.

Note that control circuit 101 provides the contention function generally shown in logic 22 for channel 12 in FIG. 6. However, it should be recognized that all contending devices could be presented to a single interface through a recirculating interface multiplexer as is shown in detail in U.S. Pat. No. 3,706,974, "Interface Multiplexer," by Patrick et al.. which is assigned to the same assignee as this application. More specifically, each of the potential interrupting sources whether they be processor set, attached devices or I/O devices could represent separate device elements contending in the multiplex interface shown generally in FIG. 1 of the Patrick et al patent. Such an arrangement would significantly reduce the supporting circuitry required for handling the multiple interrupts. Note further that the stacking and request accepting operations mentioned relative to logic 22 in channel 12 for FIG. 6 are effectively being performed by the level comparator circuit 115 of FIG. 9. Still further, the priority level control logic 54 in processor 10 of FIG. 6 is shown implemented in FIG. 9 by means of priority comparator 132 and its associated gating and conditioning circuitry.

VIII. Instruction Classes

The instruction set used with a processor in accordance with this invention provides at minimal cost sufficient capability to execute simple arithmetic and logical functions, and to control the devices and their interfacing to the host processor system. The instruction set is divided into classes. In general, the classes specify the type of operation which is performed.

Load and Store — These instructions transfer operands between main storage and the Processor. They are: Load and Zero, Load Accumulator, Store Accumulator, Load Immediate, Store Index, and Load Index Long.

Arithmetic — These instructions perform arithmetic operations between operands in main storage and/or within the Processor. They are: Add, Subtract, Add Immediate, Complement Register, Add Register, and Subtract Register.

Logical — These instructions perform logical operations between operands in main storage and/or within the Processor. They are: Logical And, Logical Exclusive Or, Logical Or, And Register, Exclusive Or Register, and Or Register.

Shift — These instructions perform left or right displacement of an Index Register or the Accumulator. They are: Shift Left Logical, Shift Right Logical, Shift Right Arithmetic and Shift Left Circular.

Branch — These include Add to Storage & Skip, Skip on Condition, Branch and Link, Branch on Condition, Branch, and Branch & Link Long.

Input/Output — This instruction controls the setting of interrupts, and communication with the I/O devices. It is: Execute Input/Output.

Register-to-Register — These instructions move data between the Control Registers, Index Registers, IAR and the Accumulator. They are: Load from Register, Store to Register, Sense Level & Mask, Inspect IAR Backup, Load Processor Status, Interchange Register, And to Mask and Or to Mask.

State Control — These instructions alter the state of the Processor. They are: Level Exit and Stop.

IX. Instruction Format

Figure 4:
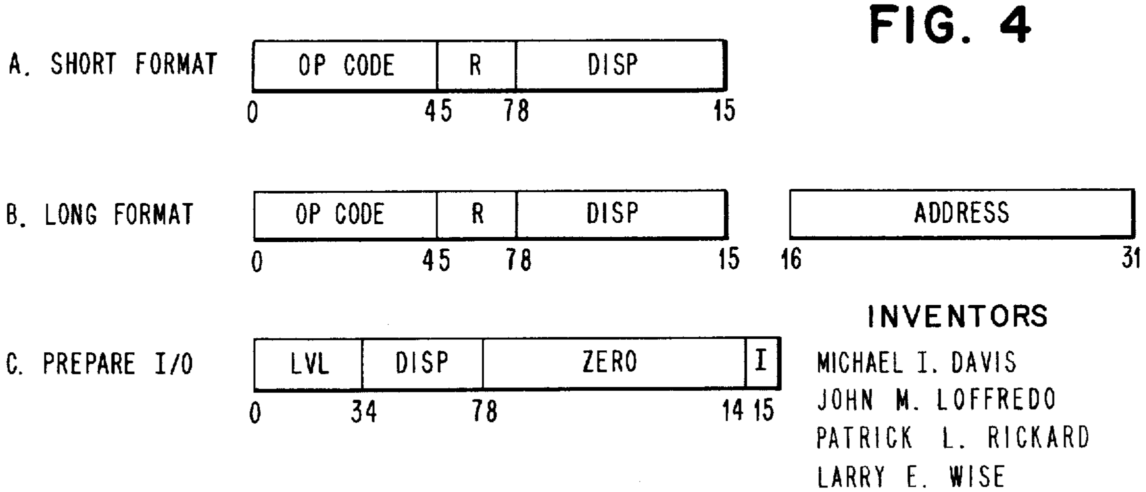
FIG. 4 outlines the general format of some instructions useful in the present invention.

Two instruction formats are provided. The Short Format instruction is sixteen bits in length as shown in FIG. 4A and the Long Format instruction of FIG. 4B is 32 bits in length. Each of the two formats is divided into several fields which specify the operation and its method of execution. Although most fields have the same meaning from one instruction to the next, some of them have special instruction-dependent meanings. The OP CODE Field is 5 bits in length and specifies the instruction operation to be performed. The R Field is three bits in length and controls the use of Index, Accumulator, and Instruction Address Registers. The Displacement Field is 8 bits in length and controls the instruction execution and/or Effective Address generation as determined by the OP Code and R Fields. The Address Field is sixteen bits in length. In the Long Format instructions, it is used in Effective Address generation; except in the PIO instruction where it is used as part of the I/O command. Most instructions refer to a location in main storage which contains the instruction operand. The address of this location is called the Effective Address (EA). There are two methods of generating the Effective Address: one method for Short Format instructions and one method for Long Format instructions.

In the FIG. 4A Short Format Instruction, the R Field and the Displacement Field (DISP) are used together to generate the Effective Address. The R Field specifies the Instruction Address Register (IAR), Accumulator (A) or an Index Register (XR). However, for Effective Address generation, the Accumulator is not referenced for one of the operands.

| | |
|---|---|
| R=000 | Instruction Address Register or Accumulator |
| R=001 | Index Register 1 |
| R=010 | Index Register 2 |
| R=011 | Index Register 3 |
| R=100 | Index Register 4 |
| R=101 | Index Register 5 |
| R=110 | Index Register 6 |
| R=111 | Index Register 7 |

The Displacement (DISP) is an eight-bit number whose high-order bit is the sign bit. Negative Displacements are in two's complement form. When used to generate an Effective Address, the sign bit is propagated through the high-order bit positions. The Effective Address is generated as follows:

$$EA = [IAR] + DISP \text{ for } R = 000$$

$$EA = [XR] + DISP \text{ for } R \quad 100$$

(Except on Branch on Condition short, where the Effective Address is the contents of register R.)

In the Long Format, the bits 8–15 Displacement is the immediate field. On all Long Format instructions except Load Index Long (PLXL), EA = (Address Field).

X. Instruction Description

Load Accumulator — PL: The contents of the main storage location specified by the Effective Address replace the contents of the Accumulator. The contents of main storage remain unchanged. The Carry and Overflow indicators remain unchanged. This instruction causes the other indicators to be changed depending on the operand stored in the Accumulator. The new value will remain (and may be tested) until another instruction changes the indicators. If the R field is zero, the Effective Address is relative to IAR.

Load and Zero — PLZ: This instruction behaves as Load Accumulator Short with the additional function that the main storage location specified by the Effective Address is set to zero. This instruction causes the other indicators to be changed depending on the operand stored in the Accumulator. The new value will remain (and may be tested) until another instruction changes the indicators. The Carry and Overflow indicators remain unchanged.

Load Immediate — PLI: The Accumulator or an Index Register is loaded with the specified operand. The register to be loaded is specified by the R field of the instruction: an R field of zero denotes the Accumulator. The Displacement Field of the instruction forms the immediate operand to be loaded. The 8-bit operand is expanded to a 16 bit operand by propagating the sign-bit value through the high-order bit positions. Carry and Overflow indicators are unchanged. This instruction causes the other indicators to be changed depending on the operand loaded in register R. The new value will remain (and may be tested) until another instruction changes the indicators.

Load Index Long — PLXL: This instruction substantially follows the FIG. 4B format except bits 5 – 7 are the R field while bits 8 – 10 are the R2 field. Bits 11–15 must be 0. the Effective Address is:

| | |
|---|---|
| EA = Contents (R2) + Address | R2 000 |
| EA = Address | R2 = 000 |

The contents of the Effective Address form the 16-bit operand which is loaded into the R1 Field-specified register.

| | | | |
|---|---|---|---|
| R1 = 000 | - ACC | R2 = 000 | - No indexing |
| | R1 or R2 = 001 - XR1 | | |
| | R1 or R2 = 010 - XR2 | | |
| | R1 or R2 = 011 - XR3 | | |
| | R1 or R2 = 100 - XR4 | | |
| | R1 or R2 = 101 - XR5 | | |
| | R1 or R2 = 110 - XR6 | | |
| | R1 or R2 = 111 - XR7 | | |

The Carry and Overflow indicators remain unchanged. This instruction causes the other indicators to be changed depending on the operand loaded into register R1. The new value will remain (and may be tested) until another instruction changes the indicators.

Store Accumulator — PST: The FIG. 4A Short Format is followed as is the case for most instructions described herein and not otherwise format designated. The contents of the Accumulator replace the contents of the main storage location specified by the Effective Address. An R field of zero designates the IAR: a non-zero R field designates an Index Register. The contents of the Accumulator remain unchanged. The Carry and Overflow indicators remain unchanged. This instruction causes the other indicators to be changed depending on the operand stored at the Effective Address. The new value will remain (and may be tested) until another instruction changes the indicators.

Store Index — PSTX: The effective address is formed by the sum of the contents of IAR and the displacement. The contents of an INDEX Register or zero replace the contents of the main storage location specified by the effective address. The register to be stored is specified by the R field, wherein a 3 bit binary count specifies the register (e.g.: R = 001 identifies XR1 while R = 111 is XR7). If R = 000, zero is stored in Effective Address.

The contents of the specified register remain unchanged. The Carry and Overflow indicators remain unchanged. The instruction causes the other indicators to be changed depending on the operand stored in the Effective Address. The new value will remain (and may be tested) until another instruction changes the indicators.

Add — PA: The contents of the main storage location specified by the Effective Address are added to the contents of the Accumulator. The result replaces the contents of the Accumulator. The contents of main storage remain unchanged. This instruction causes the indicators to be changed depending on the result loaded into the Accumulator. The new value will remain (and may be tested) until another instruction changes the indicators. An R field of zero designates IAR.

Subtract — PS: The contents of the main storage location specified by the Effective Address are subtracted from the contents of the Accumulator. The difference replaces the contents of the Accumulator. The contents of main storage remain unchanged. The instruction causes the indicators to be changed depending on the result loaded into the Accumulator. The new value will remain (and may be tested) until another instruction changes the indicators. An R field of zero designates IAR.

Logical And — PN: The contents of the main storage location specified by the Effective Address are And'ed bit by bit with the contents of the Accumulator. The result replaces the contents of the Accumulator. The contents of main storage remain unchanged. The Carry and Overflow indicators remain unchanged. This instruction causes the other indicators to be changed depending on the result loaded into the Accumulator. The new value will remain (and may be tested) until another instruction changes the indicators. An R field of zero designates IAR.

Logical Or — PO: The contents of the main storage location specified by the Effective Address are Or'ed bit by bit with the contents of the Accumulator. The contents of main storage remain unchanged. The Carry and Overflow indicators remain unchanged. This instruction causes the other indicators to be changed depending on the result loaded into the Accumulator. The new value will remain (and may be tested) until another instruction changes the indicators. An R field of zero designates IAR.

Logical Exclusive Or — PX: The contents of the main storage location specified by the Effective Address are Exclusive Or'ed bit by bit with the contents of the Accumulator. The result replaces the contents of the Accumulator. The contents of main storage remain unchanged. The Carry and Overflow indicators remain unchanged. This instruction causes the other indicators to be changed depending on the result loaded into the Accumulator. The new value will remain (and may be tested) until another instruction changes the indicators. An R field of zero designates IAR.

Register — Accumulator Instructions: PAR, PSR, PNR, POR, PXR, PSTR, PLR, PCR, PSLM, PIR, PIPS, PIIB.

An arithmetic or logical operation specified by the M field (bits 12–15 in FIG. 4A) is performed between the contents of a Register and the contents of the Accumulator These are:

M = 1 Add (PAR)
M = 2 Subtract (PSR)
M = 3 And (PNR)
M = 4 Or (POR) and
M = 5 Exclusive Or (PXR).

The result is placed in the accumulator. On the subtract operation (PSR), the Index Register is subtracted from the Accumulator. Indicators are affected as for the corresponding Storage to Accumulator instructions (PA, PS, PN, PO, PX). An R field of zero denotes the Accumulator; a non-zero R field denotes an Index Register.

Also, m = 6 means Store to Register (PSTR) while
M = 7 specifies Load from Register (PLR).

The Accumulator contents are stored into the register specified by the R field (PSTR) or the contents of the register specified by the R field are loaded into the accumulator (PLR). The Carry and Overflow indicators are not changed. These instructions cause the other indicators to be changed depending on the operand involved. The new value will remain (and may be tested) until another instruction changes the indicators. The source register is not changed in PLR. An R field of zero denotes the IAR: a non-zero R field denotes an Index Register.

M = 8 selects Complement Register (PCR). The register specified by the R field is two's complemented. The result is placed in register R. An R field of zero denotes the accumulator: a non-zero R field denotes an Index Register. The Carry indicator is not changed; if the number to be complemented is the maximum negative number representable in the Accumulator, Overflow will be set. This instruction causes the other indicators to be changed depending on the result in register R. The new value will remain (and may be tested) until another instruction changes the indicators.

M = 9 corresponds to Sense Level & Mask (PSLM). The currently active level is placed in a binary-encoded format in bit positions 14–15 of the register specified by the R field. The contents of the Mask register are placed in bit positions 0–3. Bit positions 4–13 are set to zero. The mask is not changed. The Carry and Overflow indicators are not affected. This instruction causes the other indicators to be changed depending on the operand loaded into register R. The new value will remain (and may be tested) until another instruction changes the indicators. A zero R field denotes the accumulator; a non-zero R field denotes an Index Register. If bit 11 in the instruction is a one, the mask will be degated but unchanged. No interruptions can occur. This state will continue until any PNM or POM instruction is executed. This provides a summary mask function.

M = A selects Interchange Register (PIR). The Accumulator contents are stored into the register specified by the R field and the contents of the register specified by the R field are loaded into the Accumulator. If the R field equals zero, this instruction performs as a NOOP. The Carry and Overflow indicators are not changed. This instruction causes the other indicators to be changed depending on the operand which was removed from register R into the Accumulator. The new value will remain (and may be tested) until another instruction changes the indicators.

M = B corresponds to Load Processor Status (PLPS). The Processor status is loaded into bit positions 0–9 of register R. R = 000 designates the accumulator. The Carry and Overflow indicators are not affected. This instruction causes the other indicators to be changed depending on the operand loaded into register R. The new value will remain (and may be tested) until another instruction changes them.

M = C specifies Inspect IAR Backup (PIIB). The contents of the IARB register for the selected level replace the contents of the register specified by the R field. R = 000 designates the Accumulator. Execution of this instruction, when the specified level is zero, will result in zero being loaded in the register indicated by the R field The IARB register is unchanged. The level is selected by the binary encoded value in bit positions 10 and 11 of this instruction. If the selected level is active or in process and pending (due to being preempted by a higher level), the carry indicator is turned on and the level is reset. If the selected level is not active or pending, the carry indicator is turned off. Therefore, if the selected level is pending, it is aborted (i.e. it will not automatically become the current level when all higher levels are exited). Also, if the current level is selected, it will be exited. The overflow indicator is not affected. This instruction causes the other indicators to be changed depending on the operand loaded into register R. The new value will remain (and may be tested) until another instruction changes them.

M Field values D through F are invalid and lead to a Program Check interrupt.

Skip On Condition — PSKC: The R field must be zero. Bit 8 is the overflow save Flag and bits 9–15 become the Condition field where:

Bit 9 = Condition Code Zero (i.e. Carry and Overflow both off)
Bit 10 = Result Zero
Bit 11 = Result Negative (High order bit = 1)
Bit 12 = Result Positive and not zero
Bit 13 = Result Even (low order bit = 0)
Bit 14 = Carry Indicator Off
Bit 15 = Overflow Indicator Off The seven-bit field, bits 9 through 15, is used as a condition mask. The conditions to be tested are specified by a one bit in the mask. If any of the conditions specified is true, the Instruction Address Register is incremented by one before the next instruction is fetched. This causes the program to skip the next word in the normal program sequence. If no conditions are specified, or if none of the specified conditions is true, the skip does not occur. If the Overflow indicator is tested, (bit 15 in the condition must equal to 1), it is set off if the Overflow Save Flag (Bit 8) is equal to 0. All other indicators are unaffected. The Overflow Save Flag has no effect if Condition Code Zero (Bit 9) is tested (i.e. Carry and Overflow are not changed by this test). This instruction does not affect the other indicators.

Branch and Link — PBAL: The contents of the Instruction Address Register (the location of the next sequential instruction) are stored in the register specified by the R field. The Instruction Address Register is then set to the Effective Address formed by the sum of IAR + Displacement, which becomes the location of the next instruction executed. An R field of 0 designates the Accumulator; a non-zero R field specifies an Index Register. Carry and Overflow indicators are not affected. This instruction does not affect the other indicators.

Branch and Link Long — PBALL: The FIG. 4B format is used although bits 8–15 must be zero. The contents of the Instruction Address Register are stored in the Register specified by the R field. A zero R field designates the Accumulator. A non-zero R field designates an Index Register. The Address Field is loaded into the Instruction Address Register and becomes the address of the next instruction executed. The Carry and Overflow indicators are not affected. This instruction does not affect the other indicators.

Branch — PB: The effective address replaces the contents of the Instruction Address Register and form the address of the next instruction to be executed. An R field of zero designates IAR. A non-zero R field designates an Index Register. All indicators remain unchanged.

Branch on Condition — PBC: The FIG. 4B format is used except bit 8 is an Overflow Save Flag and bits 9–15 are the Condition field where:

Bit 9 = Condition Code Zero (i.e. Carry and Overflow both off)
Bit 10 = Result Zero
Bit 11 = Result Negative (high order bit = 1)

Bit 12 = Result Positive and not zero
Bit 13 = Result Even (low order bit = 0)
Bit 14 = Carry Indicator Off
Bit 15 = Overflow Indicator Off If the R field equals zero, this instruction is long and the branch address is the contents of the Address field. If the R field does not equal zero, this instruction is short and the branch address is the contents of Index Register R.

The seven-bit field, bits 9 through 15, is used as a condition mask. The conditions to be tested are specified by bits in the mask. If none of the conditions specified is true or no conditions are specified, the Instruction Address Register is loaded with the contents of the Address field (R — 000) or the contents of an Index Register (R 000). If any of the specified conditions are true, the branch does not occur and the next sequential instruction is executed. If the Overflow indicator is tested (Bit 15 in the condition must equal to 1), it is set off if the Overflow Save Flag (Bit 8) is equal to 1. All other indicators are unaffected. The Overflow Save Flag has no effect if Condition Code Zero (Bit 9) is equal to 0. The Overflow Save Flag can be tested (i.e. Carry and Overflow are not changed by this test). This instruction does not affect the other indicators.

Shift — PSLL, PSRA, PSRL, PSLC: FIG. 4A format is used except bits 8–10 from the Modified field while bits 11–15 represent the shift count. The Register R is shifted by the number of bit positions specified in the Shift Count. The shift count may take any value in the range 0–16. Shift counts higher than 16 are invalid and lead to a Program Check interrupt in the Processor. A zero R field designates the Accumulator: a non-zero R field designates an Index Register. Bits 8-10 form a modifier on the shift instruction:

000 — Shift Left Circular (PSLC). Register R is rotated left logical the number of bit positions specified in the shift count. The Carry and Overflow indicators are not changed. This instruction causes the other indicators to be changed depending on the result of the shift operation. The new value will remain (and may be tested) until another instruction changes the indicators.

001 — Shift Left Logical — (PSLL). Register R is shifted left by the number of bit positions specified in the shift count. Vacated low-order positions are set to zero. The Overflow indicator is unchanged. Bits shifted out of bit 0 of the Register R control the Carry indicator. A one sets the Carry and a zero resets it. This instruction causes the other indicators to be changed depending on the result of the shift operation. The new value will remain (and may be tested) until another instruction changes the indicators.

010 — Shift Right Logical — (PSRL). Register R is shifted right the number of bit positions specified by the Shift Count. The Carry and Overflow indicators are not changed. This instruction causes the other indicators to be changed depending on the result of the shift operation. The new value will remain (and may be tested) until another instruction changes the indicators. Vacated high-order bit positions of the Register R are set to zero.

011 — Shift Right Arithmetic — (PSRA). Register R is shifted right the number of bit positions specified by the Shift Count. The value of the sign (the high-order bit) is entered into the vacated high-order bit positions of the Register R. The Carry and Overflow indicators remain unchanged. This instruction causes the other indicators to be changed depending on the result of the shift operation. The new value will remain (and may be tested) until another instruction changes the indicators.

Add Immediate — (PAI): FIG. 4A applies except the operand field is expanded to 16 bits by sign propagation to the 8 high-order bits 8–15. It is then added to the contents of the register specified by the R field. The result is placed in the register R. A zero R field designates the Accumulator. A non-zero R field designates an Index Register. Carry and Overflow indicators are affected as for the Add (PA) instruction. This instruction causes the other indicators to be changed depending on the result loaded into Register R. The new value will remain (and may be tested) until another instruction changes the indicators.

Add to Storage and Skip — (PAS): The storage location specified by the effective address is incremented by one. Carry and Overflow indicators are not affected. This instruction causes the other indicators to be changed depending on the result stored into the effective address. The new value will remain (and may be tested) until another instruction changes the indicators. If the result is zero, the IAR is incremented by one before the next instruction is fetched. A zero R field designates the IAR but a non-zero R field designates an Index Register.

And and Or to Mask — (PNM and POM). FIG. 4A format applies except bits 8–14 are zero and bit 15 is the "C" bit. The contents of bits 0–3 of the register specified by the R field are And'ed (C=0, PNM) or Or'ed (C=1, POM) with the contents of the Interrupt Mask register, and the result is placed in the Mask Register. A zero R field denotes the Accumulator: a non-zero R field denotes an Index Register. The source register is not changed. Carry and Overflow indicators are not affected. This instruction does not affect the other indicators. A one bit in the mask permits an interrupt.

Execute I/O — (PIO): This follows the FIG. 8 format wherein bits 11–15 must be zero. The operation of this instruction and the bit field definitions will be described later. Generally, however, the Condition Code is set into the Carry and Overflow indicators. Carry is bit 0, and Overflow is bit 1. The other indicators are not affected by a PIO Immediate Write. However, the indicators are changed to reflect the data that is loaded into the specified register by the PIO Immediate Read Instruction.

Level Exit — (PLEX): Bits 0–4 define the Op Code, but bits 5–15 are zero. When this instruction is executed, the Processor exits the current level: if no other interrupts are pending, the Processor will enter the Wait State. The Carry and Overflow indicators are not changed. This instruction does not affect the other indicators.

Stop — (PSTP): This is a 16 bit instruction wherein bits 0–4 are the unique Op Code but bits 5–15 must be zero. This instruction will be executed only when the system is externally conditioned to do so such as when a Console Key switch is in the "enable" position. Otherwise this instruction will perform as a No-Op. When this Instruction is executed, the Processor enters the Stop State at the end of this instruction. No indicators are affected by this instruction.

XI. I/O Operations

Figure 8:
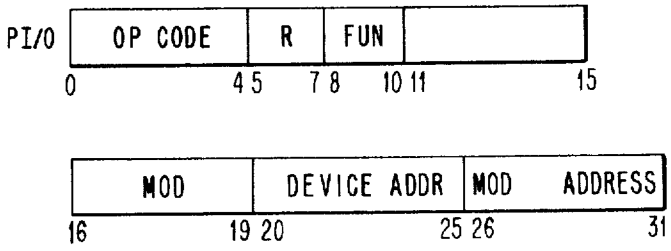
FIG. 8 shows an arrangement of an additional instruction useful in conjunction with the present invention.

The Processor I/O instruction format is as shown in FIG. 8. The various fields have the following significance: Bits 0–4 — These bits are the Processor operation code field. The value 00001 corresponds to PIO. The R field is used to identify the register within the Processor which is involved with this I/O instruction. An R field of zero denotes the accumulator.

On Immediate write/read commands, the R field specifies the register which is the source/target for the data to be transferred. On Prepare I/O, the R field specifies the register which is the source of the prepare information which will be transferred to the interrupt source. The R field is not used on Halt I/O. On Set Interrupt, the R field specifies the register which contains the set interrupt data which will be transferred to the Direct Control Channel.

FUN — The function field specifies the type of I/O command to be performed. These can be Immediate Write, Immediate Read, Prepare I/O, Halt I/O or Set Interrupt. Invalid functions result in a program check interrupt in the Processor.

MOD — The modifier field is only used on Immediate Read or Write commands. It is used by the addressed device to determine the operation to be performed.

The Device Address field is 6 bits of binary encoded addressing information. It identifies a point, group or device within a module. The Module Address Field is a binary-encoded 6-bit field which is used to select the module being addressed by the PIO instruction.

The condition code indicates to the program whether or not the I/O operation specified by the PIO instruction was performed successfully and, if not, the reason for the failure. The order in which condition codes are generated on an I/O operation is as follows: (1) Condition Code 3 — not attached, (2) Condition Code 2 — Busy or Interruption pending, (3) Condition Code 1 — Error, and (4) condition Code 0 — Successful.

Immediate Write: This Immediate Write command provides the necessary parameters to transfer 16 bits of data from the specified register in the Processor to the addressed device. The modifier field specifies the operation to be executed at the device. If the operation was successfully executed or initiated, condition code 0 is set. If an error is detected, condition code 1 is set and the status is stored in the DSW or Device Status Word. If the device is busy or in the interruption pending state, condition code 2 is set. If the device is not attached, condition code 3 is set.

Immediate Read — The Immediate Read command provides the necessary parameters to transfer 16 bits of data from the addressed device to the specified register in the Processor. The modifier field specifies the operation to be executed at the device. Condition codes, in general, are set as in the Immediate Write command.

Prepare I/O — The Prepare I/O command is executed in the same manner as the Immediate Write command. The parameters passed to the device by the Prepare I/O command are used by the device to determine if it is allowed to interrupt and on what level and displacement. The function performed by this command permits rapid, dynamic allocation and modification of the priorities of interruption devices, and of the code with which they are associated. Prepare I/O allows this allocation function to be performed by software even while other programs are running. In the prior art, this function has been built into the hardware and engineering action is required to change it. Operation of the system must be stopped while the change is made. Prepare I/O is an additional facility which further enhances the interruption mechanism of the present invention such as is implemented in the IBM System 7. The modifier field is zero and the 16 bit byte of data which is transferred has the following significance: LVL — 4 bits (bits 0–3) which specify the priority interrupt level assigned to the interrupting source. The Processor as described herein is assumed to support 4 priority levels (0—3); therefore, only bit position 2 and 3 of this field are used. That is, the Direct Control Channel will ignore bits 0 and 1. These two bits must be zero.

DISP — Four bits (bits 4–7) which specify one of sixteen unique displacements for each interrupt level. The Processor uses this field to locate the appropriate branch address to reference the prestored servicing routine. Bits 8–14 are zero.

I — The I bit (bit 15) performs an interrupt/no interrupt control over the interrupting source (i.e. a per-device mask). A one bit permits an interrupt. An interruption source which is controlled by the Prepare I/O function must not request an interrupt if its 'I' bit is zero. If an interruption-causing command is directed to an interrupting source which has its I bit equal to zero, condition code 1 is set and Command Reject is stored in the DSW (or CSW if the device is in the Control Module). The command is not executed.

If the Prepare I/O operation is successfully executed, condition code 0 is set. If an error is detected, condition code 1 is set and the status is stored in the DSW (or CSW if the addressed device is in the Control Module). If the addressed interruption source is busy or in the interruption pending state, condition code 2 is set. If the addressed module is not attached, condition code 3 is set.

The prepare information stored at an interruption source is reset only on system reset.

Halt I/O — The Halt I/O command resets the addressed I/O module. Halt I/O with a Module Address of zero will cause a program check interrupt in the Processor. Sensor-based output points and prepare fields are not reset. Other controls, status, and pending interrupts are reset. If the module is present, it will be reset and condition code 0 will be set. If the module is not attached, condition code 3 will be set. No other condition code will occur. If a device has an interrupt pending in the Processor interrupt buffer, this will not be reset by Halt I/O. Therefore, an interrupt from a source which has been reset may actually be presented to the Processor.

Set Interrupt — The Set Interrupt command is issued by the Processor. It provides the information necessary to set a priority interrupt to the Processor or an "attention" interrupt to a host CPU. The Module Address field must designate the Control Module. If the Module Address Field is non-zero, a Program Check interrupt will be generated. The specified register must contain data in a format wherein bits 0–3 specify the level and bit 15 is an "A" bit. The A bit directs the interrupt to the Processor or the host. Bits 4 through 14 are reserved and must be zero.

If the A bit equals 0, the LVL field has the same significance as in the Prepare I/O command and the interrupt is directed to the Processor 10. The LVL field is sent to the Direct Control Channel 12. If the Direct Control Channel 12 successfully enters this interrupt into the interrupt buffer mechanism, condition code 0 will be set. If the requested level has already been program set, condition code 2 will be set. Condition codes 1 and 3 are not used in this case of the set interrupt command.

This form of the Set Interrupt command is used for program dispatching within the Processor.

If the A bit equals 1, the interrupt is directed to the host. In this case, the Set Interrupt command is used to request service from a host Processor. The host attachment 13 generates an interrupt to the host and the attachment status bit corresponding to attention is set. If the attention bit is successfully activated, condition code 0 will be set. If the attention bit is already active, condition code 2 will be set. If the Host is not available or no Host is in the system configuration, condition code 3 is set. Condition code 1 is not used in this case of the Set Interrupt command The present invention has been described in some detail herein but published material describing additional detail is available particularly with respect to implementation of this invention in the IBM System/ 7. One example of such a publication is the IBM Maintenance Library publication entitled, "System/7 Theory-Maintenance", (IBM SY34-0027-0, copyrighted by International Business Machines Corporation in June 1971) which is specifically incorporated herein by reference and which itemizes other available publications.

Although the invention has been particularly described and shown relative to the foregoing embodiments, it will be understood by those having normal skill in the art that various other changes, additions and modifications may be made without departing from the spirit of this invention.

What is claimed is:

1. A data processor system for responding to service request signals from attached sources so as to perform data processing tasks based upon a hierarchy of priority levels, said system comprising addressable storage means, logic circuitry for performing data processing operations including arithmetic and logical manipulations and data exchanges with said storage means, a plurality of control circuit groups each allocated to a respective priority level in the hierarchy and each capable of controlling the operation of said logic circuitry independent of the other of said groups, each said group including a plurality of registers sufficient to complete a central processing unit configuration in conjunction with said storage means and said logic circuitry, and means responsive to service request signals having priority level identification associated therewith for actuating only the said control circuit group corresponding to the priority level of the highest priority service request signal present and for deactuating all other said control circuit groups, whereby control of said logic circuitry will be granted to the actuated highest priority control circuit group regardless of the presence of service request signals of lower ordered priority levels.

2. A data processor system in accordance with claim 1 wherein said actuating means responds to receipt of a higher priority level service request signal by deactuating the operation of a lower priority level said control circuit group at a point where the said registers thereof have sufficient data to permit subsequent reactuation of the interrupted said lower level control circuit group and completion of the interrupted operation thereof.

3. A data processor system in accordance with claim 2 wherein said actuating means includes means for actuating all of said registers of the said group corresponding to the selected said priority level while causing said registers of any interrupted said group to retain data reflecting their status upon interruption.

4. A data processor system in accordance with claim 2 wherein said apparatus is operable with a plurality of external units capable of generating service request signals and having means for storing data defining a priority level, said apparatus further comprising means for selecting at least one of the external units, means for transferring a priority level defining data signal to the selected external unit for storage therein, said actuating means including means responsive to a service request signal from the selected external unit for receiving a priority level defining signal generated by the selected external unit in correlation to the priority level defining data signal received from said transferring means to the selected said circuit and means for actuating the said control circuit group corresponding to the priority level thus defined.

5. A data processor system in accordance with claim 3 which further includes a plurality of external units each including storing means, means for composing an output signal as a function of the content of said storing means, and means for generating service request signals, said apparatus further including means for selecting said external units and means for transferring priority level defining signals to the said storing means of the selected said units, said actuating means being responsive to said composing means output signal and said service request signal from a said external unit for actuating the said group having a priority level corresponding to said composing means output signal.

6. A data processor system in accordance with claim 5 wherein said external units each includes a second storing means, said addressable storage means having a plurality of separately addressable subroutines stored at different locations therein, means for transferring data correlated with at least one of said subroutine addresses to said second storing means of a selected said external unit, said actuating means being further responsive to a service request signal from said external unit for receiving said transferred data from said external unit second storing means and including means for causing the selected said control circuit group to operate with said logic circuitry and said addressable storage means in accordance with the prestored subroutine addressed by said data received from said external unit second storing means.

7. A data processor system in accordance with claim 6 wherein each said external unit includes means for storing data indicative of a plurality of conditions of the associated said control unit, logic means for monitoring said condition data storing means for producing an output whenever said condition data indicates special attention is required by said external unit from said controlling unit, and means operable in conjunction with said service request from the associated said external unit for presenting said monitoring logic means output to said controlling unit, whereby said controlling unit can bypass status data interchanges with said external unit except when said monitoring logic means output is received.

8. A data processor operable in conjunction with attached devices, said data processor comprising addressable data storage means, logic circuitry including means for handling data retrieval from and storage into addressable locations in said storage means and means for performing data processing operations, a plurality of control circuit groups each allocated to a respective priority level and each capable of controlling the operation of said logic circuitry including the addressing of said storage means for data retrieval and entry therein independent of the other of said groups, said control groups each including a storage instruction address register, an arithmetic partial result storing register, at least one index register, and means for retaining operating condition identifying signals, and means for responding to attached device originated interrupt request signals having priority level identification associated therewith by actuating only the said control circuit group corresponding to the priority level of the highest priority said interrupt request signal which is present, whereby control of said logic circuitry and said storage means will be granted to the said control circuit group having the highest priority regardless of the presence of lower ordered priority interrupt service requests.

9. A data processor in accordance with claim 8, which further includes means for retaining an indication of the said control circuit group which was interrupted by a higher priority said circuit group, and means responsive to said retaining means indication after all higher order interrupt requests have been serviced by returning control of said storage means and said logic circuitry to the interrupted said control circuit group.

10. A data processor in accordance with claim 8 wherein said interrupt request responding means causes the said registers and condition retaining means of an interrupted said group to be suspended at an interruptable point in the operation thereof so that said registers and condition retaining means can be reactuated and continue control of said storage and said logic circuitry at the point of interruption whenever all higher level priority interrupt requests have been serviced.

11. An external unit for use in a data processing system requiring data exchanges between a central controlling unit and a plurality of said external units based upon a priority level, said unit comprising means for generating a signal indicative that the external unit requires servicing by said central controlling unit, means for receiving a priority level identifying signal from said central controlling unit, means for storing said priority level identifying signal, means for presenting said priority level identifying signal to said central controlling unit in conjunction with said signal from said generating means, means responsive to a signal from said central controlling unit indicative that service requests cannot be accepted for preventing said presenting means from producing an output to said central controlling unit, and means responsive to a signal from said central controlling unit indicative that service requests can be presented for disabling said preventing means thereby permitting said presenting means to operate whenever a signal has been produced by said generating means.

12. An external unit for use in a data processing system requiring data exchanges between a plurality of said external units and a controlling unit, said unit comprising means for storing data indicative of a plurality of conditions of the associated external unit, logic means for monitoring said condition data storing means for producing an output signal whenever said condition data indicates that special attention is required by said external unit from said controlling unit, means for generating an output signal indicative that said external unit requires servicing by said controlling unit, and means for presenting said logic means output signal to said controlling unit in conjunction with said generating means output signal.

13. A data processing system having digital data exchanges between a controlling unit and a device, said system comprising means for selectively producing a byte identifying the priority level on which interrupt servicing is to be granted, and means for broadcasting either a first or second signal indicating that said controlling unit can and cannot accept service requests, respectively, a plurality of devices each including a. means for generating an interrupt request signal indicative that the associated said device requires servicing by said controlling unit, b. means for storing at least one byte of information, c. means responsive to a selection signal from said controlling unit for transferring said byte from said producing means to said storing means, d. means for coupling said interrupt request signal and the stored said byte to said controlling unit, e. means responsive to said second broadcasting means signal for preventing said coupling means from producing an output to said controlling unit, and f. means responsive to said first broadcasting means signal for deactuating said preventing means thereby permitting said coupling means to present an output to said controlling unit.

14. A data processing system in accordance with claim 13 wherein each said device further includes means for storing data indicative of conditions of the associated said device, logic means for monitoring said condition data storing means for producing an output signal whenever said condition data requires special attention from said controlling unit, and said interrupt request signal coupling means further including means for coupling said logic means output signal to said controlling unit.

* * * * *